United States Patent
Whittle et al.

(10) Patent No.: US 11,149,559 B2
(45) Date of Patent: Oct. 19, 2021

(54) TURBINE SECTION ASSEMBLY WITH CERAMIC MATRIX COMPOSITE VANE

(71) Applicant: Rolls-Royce plc, London (GB)

(72) Inventors: Michael J. Whittle, London (GB); Anthony G. Razzell, London (GB); Roderick M. Townes, London (GB); David J. Shepherd, London (GB); Duncan Forbes, London (GB)

(73) Assignee: Rolls-Royce plc

(*) Notice: Subject to any disclaimer, the term of this patent is extended or adjusted under 35 U.S.C. 154(b) by 353 days.

(21) Appl. No.: 16/410,538

(22) Filed: May 13, 2019

(65) Prior Publication Data
US 2020/0362707 A1 Nov. 19, 2020

(51) Int. Cl.
*F01D 5/28* (2006.01)
*F01D 9/04* (2006.01)

(52) U.S. Cl.
CPC ............ *F01D 5/282* (2013.01); *F01D 5/284* (2013.01); *F01D 9/042* (2013.01)

(58) Field of Classification Search
CPC . F01D 5/282; F01D 5/284; F01D 5/28; F01D 5/042; F01D 5/04; F01D 25/246; F01D 25/24; B64D 2027/262; B64D 2027/264
See application file for complete search history.

(56) References Cited

U.S. PATENT DOCUMENTS

| | | | |
|---|---|---|---|
| 2,996,279 A * | 8/1961 | Lorett | F01D 9/042 415/110 |
| 5,078,576 A | 1/1992 | Hayton | |
| 5,511,940 A * | 4/1996 | Boyd | F01D 5/284 415/200 |
| 5,630,700 A * | 5/1997 | Olsen | F01D 9/042 415/134 |
| 6,325,593 B1 | 12/2001 | Darkins, Jr. et al. | |
| 6,514,046 B1 | 2/2003 | Morrison et al. | |
| 6,558,114 B1 | 5/2003 | Tapley et al. | |
| 6,648,597 B1 * | 11/2003 | Widrig | C04B 37/001 415/200 |
| 6,860,716 B2 | 3/2005 | Czachor et al. | |
| 6,884,030 B2 | 4/2005 | Darkins, Jr. et al. | |
| 7,588,414 B2 | 9/2009 | Wunderlich et al. | |
| 7,762,766 B2 | 7/2010 | Shteyman et al. | |
| 8,371,127 B2 | 2/2013 | Durocher et al. | |
| 8,454,303 B2 | 6/2013 | Garcia-Crespo | |
| 9,097,141 B2 | 8/2015 | Paradis | |
| 9,546,557 B2 | 1/2017 | Grooms, III et al. | |
| 9,890,663 B2 | 2/2018 | Scott | |
| 9,915,159 B2 | 3/2018 | Huizenga et al. | |
| 10,054,009 B2 | 8/2018 | Scott | |
| 10,174,627 B2 | 1/2019 | Chang et al. | |
| 2004/0253096 A1 | 12/2004 | Legg | |

(Continued)

*Primary Examiner* — Igor Kershteyn
*Assistant Examiner* — Joshua R Beebe
(74) *Attorney, Agent, or Firm* — Barnes & Thornburg LLP

(57) ABSTRACT

A turbine assembly adapted for use in a gas turbine engine is disclosed in this paper. The turbine assembly includes a turbine vane comprising ceramic matrix composite materials configured for use in high temperature environments. The turbine assembly further includes a vane-stage support for holding the turbine vane and other components in place relative to a turbine case.

20 Claims, 7 Drawing Sheets

(56) References Cited

U.S. PATENT DOCUMENTS

| | | |
|---|---|---|
| 2010/0068034 A1* | 3/2010 | Schiavo .................. F01D 5/282 |
| | | 415/115 |
| 2014/0234118 A1 | 8/2014 | Beaujard et al. |
| 2014/0255174 A1 | 9/2014 | Duelm et al. |
| 2016/0123163 A1* | 5/2016 | Freeman ............... F01D 25/005 |
| | | 415/200 |
| 2016/0123164 A1 | 5/2016 | Freeman et al. |
| 2016/0177761 A1 | 6/2016 | Huizenga et al. |
| 2016/0201488 A1 | 7/2016 | Carr et al. |
| 2017/0022833 A1 | 1/2017 | Heitman et al. |
| 2017/0051619 A1 | 2/2017 | Tuertscher |
| 2017/0107843 A1 | 4/2017 | Humhauser et al. |
| 2018/0045117 A1 | 2/2018 | Groves, II et al. |
| 2018/0223680 A1 | 8/2018 | Hafner |
| 2018/0238181 A1 | 8/2018 | Reynolds et al. |
| 2018/0238184 A1 | 8/2018 | Reynolds et al. |
| 2018/0328187 A1 | 11/2018 | Oke |
| 2018/0340431 A1 | 11/2018 | Kems et al. |
| 2018/0370158 A1 | 12/2018 | Gallier et al. |

* cited by examiner

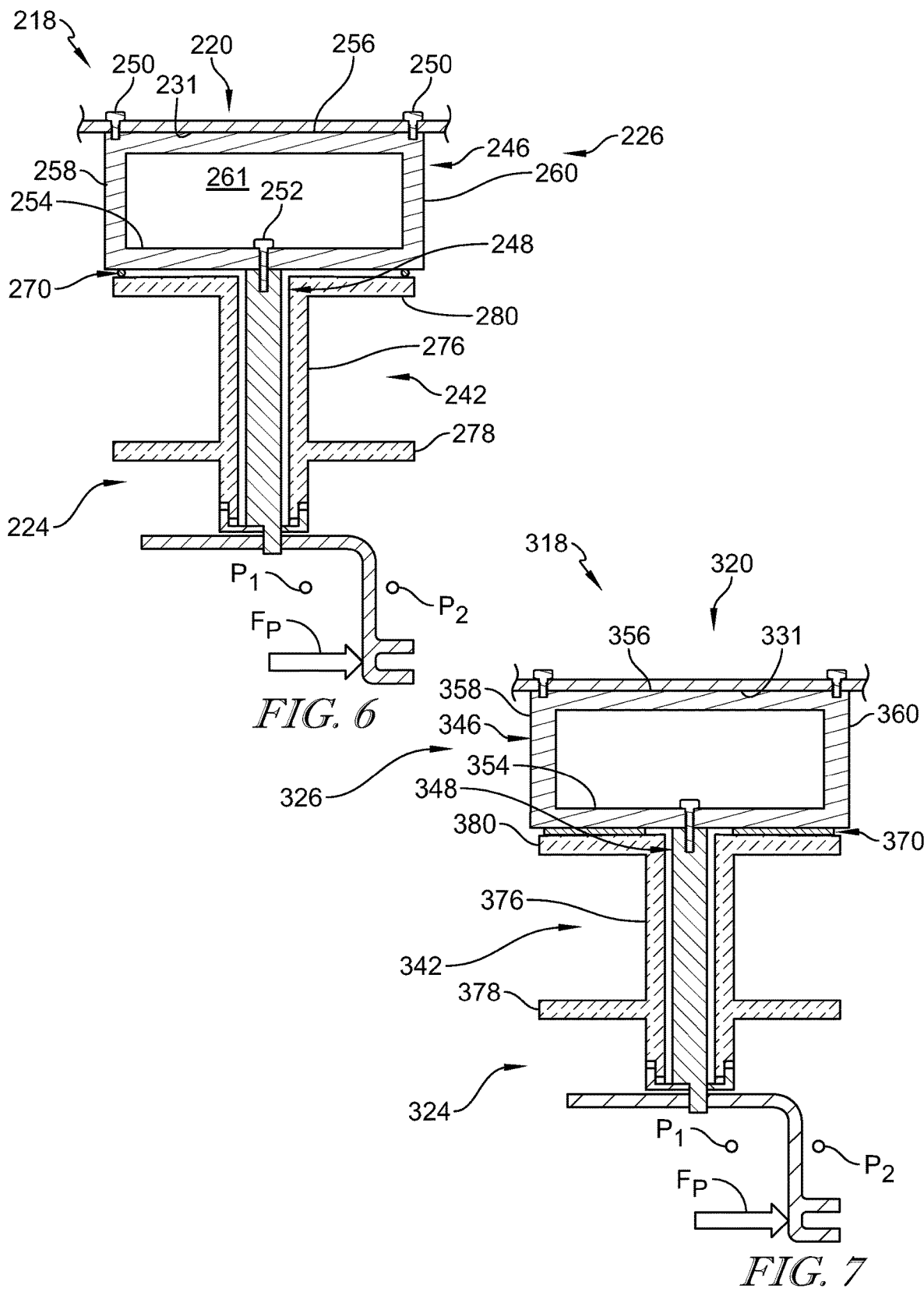

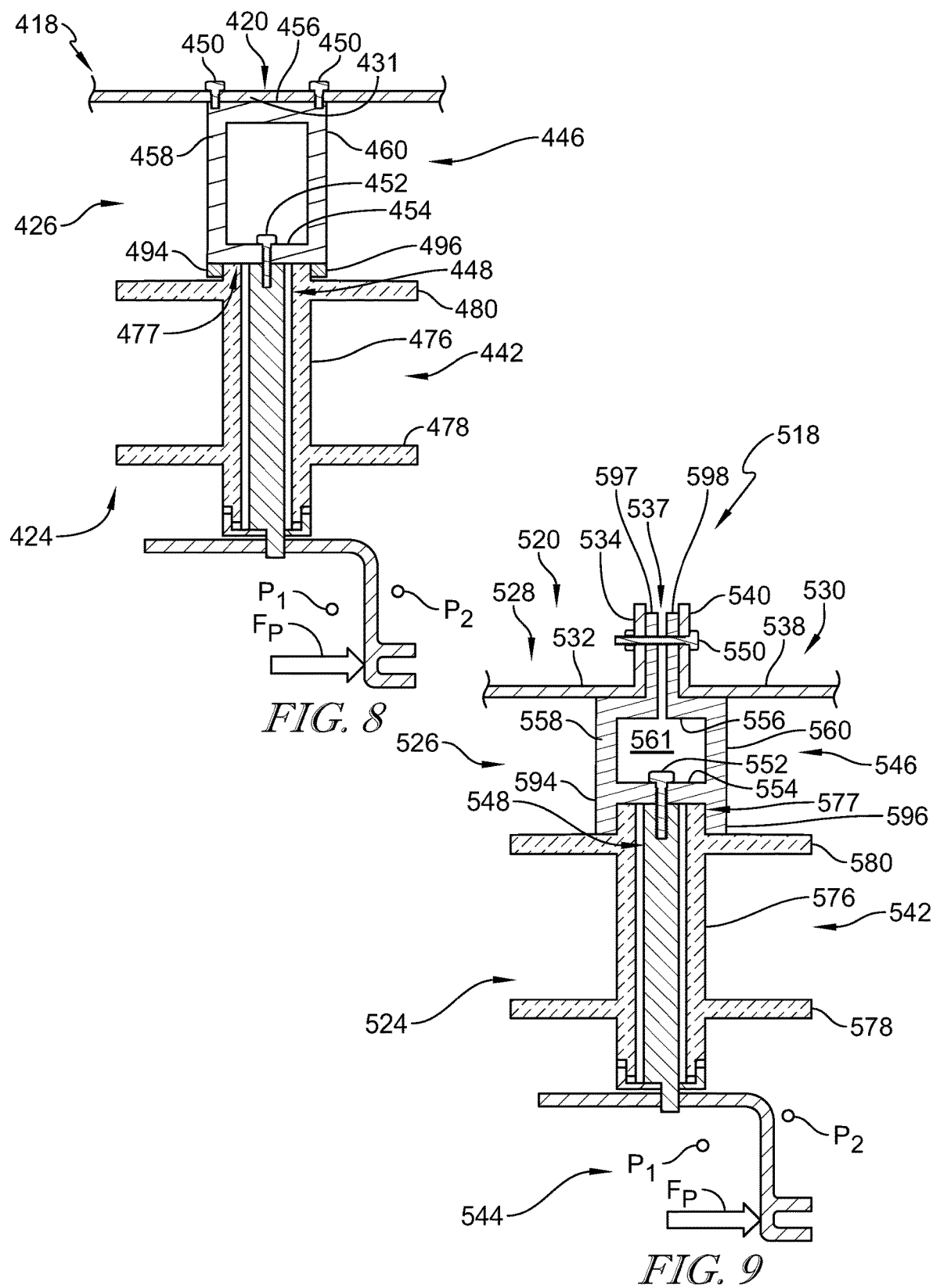

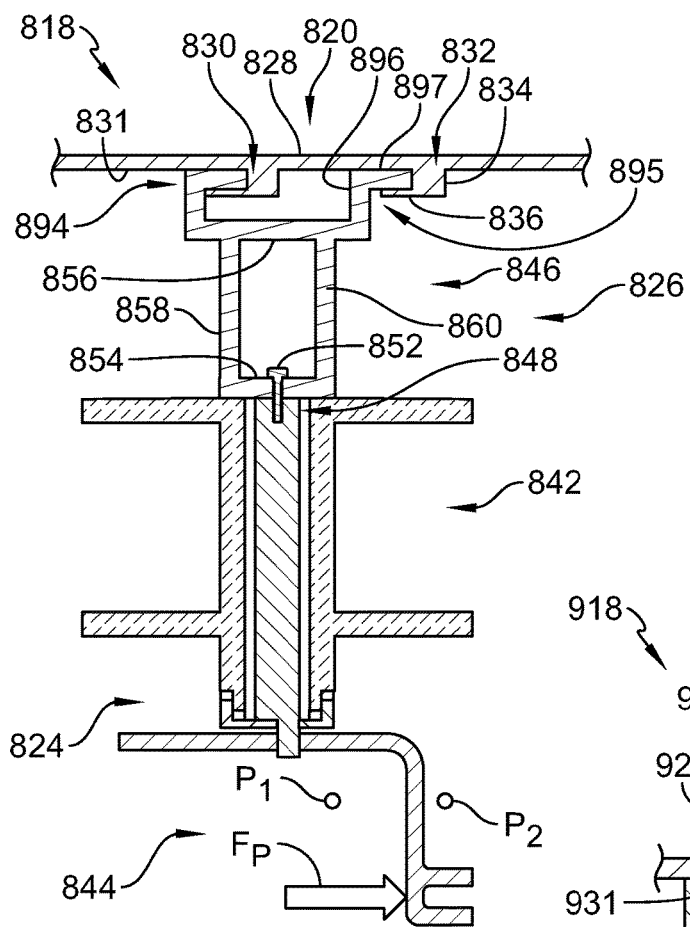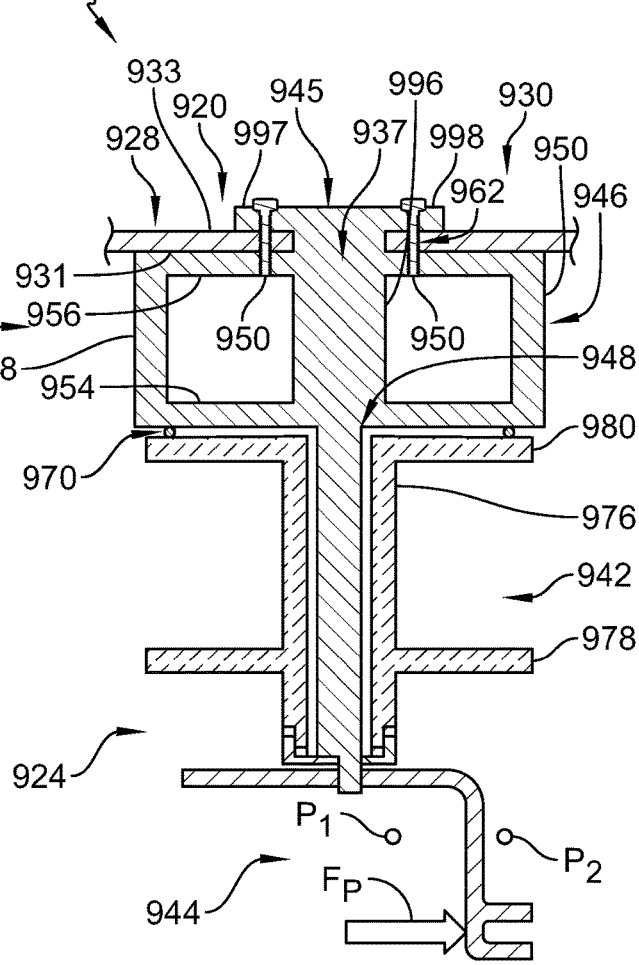

TURBINE SECTION ASSEMBLY WITH CERAMIC MATRIX COMPOSITE VANE

FIELD OF THE DISCLOSURE

The present disclosure relates generally to gas turbine engines, and more specifically to turbine sections of such engines—especially those with ceramic matrix composite vanes.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A turbine assembly adapted for use in a gas turbine engine with a turbine vane comprising ceramic matrix composite materials configured to redirect air moving through a primary gas path of the gas turbine may include a turbine case, a vane stage, and a vane-stage support. The turbine case may be generally arranged around a central reference axis.

In some embodiments, the vane stage may include the turbine vane comprising ceramic matrix composite materials and an inner vane seal land. The turbine vane may be shaped to form an airfoil that extends across the primary gas path of the gas turbine engine. The inner vane seal land may be located radially inward of the turbine vane outside of the primary gas path. The inner vane seal land may be configured to be engaged by a rotating component to create a seal that separates pressure zones within the gas turbine engine when the turbine assembly is used in the gas turbine engine.

In some embodiments, the vane-stage support may comprise metallic materials. In some embodiments, the vane-stage support may be configured to hold the turbine vane and the inner vane seal land in place relative to the turbine case.

In some embodiments, the vane-stage support may include a torsion box and a spar. The torsion box may be arranged radially inward of the turbine case and radially outward of the turbine vane and may be shaped to have a rectangular or topologically similar shape when viewed in a circumferential direction around the central reference axis. The spar may extend radially inwardly from the torsion box through the airfoil of the turbine vane to the inner vane seal land. In some embodiments, the turbine vane and the inner vane seal land are coupled to the spar so that forces applied to the vane stage are carried by the spar to the torsion box and ultimately the turbine case during use of the turbine assembly in the gas turbine engine.

In some embodiments, the vane-stage support may further include case fasteners. The case fasteners may extend through holes formed in the turbine case and engage the torsion box of the vane-stage support to fix the torsion box to the turbine case.

In some embodiments, the case fasteners may include threaded fasteners. The threaded fasteners may engage tapped holes formed in panels that make up the rectangular shape of the torsion box.

In some embodiments, the vane-stage support may include spar fasteners. The spar fasteners may fix the spar to the torsion box.

In some embodiments, the spar fasteners may be threaded fasteners. The threaded fasteners may extend at least partway into a panel of the torsion box that defines at least a part of the rectangular shape.

In some embodiments, the turbine vane of the vane stage may include an inner platform, an outer platform, and the airfoil. The inner platform may extend from the airfoil to define an inner boundary of the primary gas path. The outer platform may be spaced radially outwardly from the inner platform and may extend from the airfoil to define an outer boundary of the primary gas path.

In some embodiments, the rectangular shape provided by the torsion box of the vane-stage support extends axially forward or aft of the outer platform. In some embodiments, the torsion box may include an axial locating shoulder. The axial locating shoulder may extend from the rectangular shape and engage the turbine vane to block axial movement of the turbine vane in at least one direction.

In some embodiments, the torsion box may include a forward axial locating shoulder and an aft axial locating shoulder. The forward axial locating shoulder may be located radially inward of the rectangular shape and may engage a forward facing side of the turbine vane to block forward movement of the turbine vane relative to the torsion box. The aft axial locating shoulder may be located radially inward of the rectangular shape and may engage an aft facing side of the turbine vane to block aftward movement of the turbine vane relative to the torsion box.

In some embodiments, the turbine case may include a forward shell and an aft shell. In some embodiments, the torsion box may include at least one case-coupling flange arranged between the forward shell and the aft shell of the turbine case to couple the torsion box to the turbine case.

In some embodiments, the forward casing may include an annular shell and a forward flange that extends radially outwardly from the annular shell. In some embodiments, the aft casing may include an annular shell and an aft flange that extends radially outwardly. In some embodiments, the vane-stage support may include case fasteners that extend axially into the forward flange, through the case-coupling flange, and into the aft flange.

In some embodiments, the coupling flange may extend along a radially-outwardly facing surface of the case. The coupling flange may include a spar fixture, a forward portion, and an aft portion. The spar fixture may extend radially-inwardly from the coupling flange through a mount aperture formed in the case and may couple to the spar inside the case. The forward portion may extend axially forward of the mount aperture. The aft portion may extend axially aft of the mount aperture.

In some embodiments, the torsion box may include hangers. The hangers may extend radially outward from the rectangular shape and may engage brackets included in the turbine case to couple the vane-stage support to the turbine case. In some embodiments, the hangers may each be shaped to have an L-shape when viewed in the circumferential direction around the central reference axis.

In some embodiments, the hangers may include a forward hanger and an aft hanger. The forward hanger may extend axially forward from the torsion box and engage a forward bracket included in the turbine case. The aft hanger may extend axially aft from the torsion box and engage an aft bracket included in the turbine case.

According to another aspect of the present disclosure, a turbine assembly adapted for use in a gas turbine engine may include a turbine case, a turbine vane, an inner vane seal land, and a vane-stage support. The turbine case may be generally arranged around a central axis. The turbine vane may comprise ceramic matrix composite materials shaped to form an airfoil. The inner vane seal land may be located radially inward of the turbine vane. The vane-stage support may be configured to hold the turbine vane and the inner vane seal land in place relative to the turbine case.

In some embodiments, the turbine case may include a forward casing and an aft casing. The forward casing may have a forward flange that extends radially. The aft casing may have an aft flange that extends radially outwardly.

In some embodiments, the vane-stage support may include a torsion box and a spar. The torsion box may be arranged radially inward of the turbine case and radially outward of the turbine vane. The spar may extend inwardly from the torsion box through the airfoil of the turbine vane to the inner vane seal land.

In some embodiments, the spar may support the inner vane seal land so that forces applied to the inner vane seal land are carried by the spar to the torsion box and turbine case during use of the turbine assembly in the gas turbine engine. In some embodiments, the torsion box may be shaped to have a C-shape cross-section when viewed in a circumferential direction around the central reference axis.

In some embodiments, the vane-stage support may further include case fasteners. The case fasteners may extend through holes formed in the turbine case and engage the torsion box of the vane-stage support to fix the torsion box to the turbine case.

In some embodiments, the case fasteners may include threaded fasteners. The threaded fasteners may engage tapped holes formed in a panel of the torsion box that defines at least a part of the C-shape.

In some embodiments, the vane-stage support may further include spar fasteners. The spar fasteners may fix the spar to the torsion box.

These and other features of the present disclosure will become more apparent from the following description of the illustrative embodiments.

BRIEF DESCRIPTION OF THE DRAWINGS

FIG. 6 is a detail view of another embodiment of a vane-stage support to be included in the turbine assembly of FIG. 2 showing that the vane-stage support includes a torsion box that extends to both forward and aft ends of an outer platform included in the vane of the vane stage and a compliant seal arranged between the torsion box and the turbine vane at the forward and aft ends of the turbine vane to seal therebetween;

FIG. 7 is a detail view of another embodiment of a vane-stage support to be included in the turbine assembly of FIG. 2 showing that the vane-stage support includes a torsion box that extends to both forward and aft ends of an outer platform included in the vane of the vane stage and a compliant layer arranged between the torsion box and the turbine vane interface to seal therebetween;

FIG. 8 is a detail view of another embodiment of a vane-stage support to be included in the turbine assembly of FIG. 2 showing the vane-stage support includes a torsion box and a spar that extends from the torsion box radially through the airfoil of the vane stage and couples to the inner vane seal land to transmit forces applied to the vane stage to the torsion box and out through the turbine case, and showing the torsion box includes forward and aft axial locating shoulders;

FIG. 9 is a detail view of another embodiment of a vane-stage support to be included in the turbine assembly of FIG. 2 showing the vane-stage support includes a torsion box and a spar that extends from the torsion box radially through the airfoil of the turbine vane stage and couples to the inner vane seal land to transmit forces applied to the vane stage to the torsion box and out through the turbine case, and showing the torsion box includes at least one coupling flange that extends out through the turbine case;

FIG. 12 is a detail view of another embodiment of a vane-stage support to be included in the turbine assembly of FIG. 2 showing that the vane-stage support includes a torsion box and a spar that extends from the torsion box radially through the airfoil of the turbine vane and couples to the inner vane seal land to transmit forces applied to the vane stage to the torsion box and out through the turbine case, and showing the torsion box includes forward and aft hangers radially outward from the rectangular shape that couple with forward and aft brackets in the turbine case; and FIG. 13 is a detail view of another embodiment of vane-stage support to be include in the turbine assembly of FIG. 2 showing that the vane-stage support includes torsion box and a spar that extends from the torsion box radially through the airfoil of the turbine vane and couples to the inner vane seal land to transmit forces applied to the vane stage to the torsion box and out through the turbine case, and showing the torsion box extends axially forward and aft of the turbine vane.

DETAILED DESCRIPTION OF THE DRAWINGS

Figure 1:
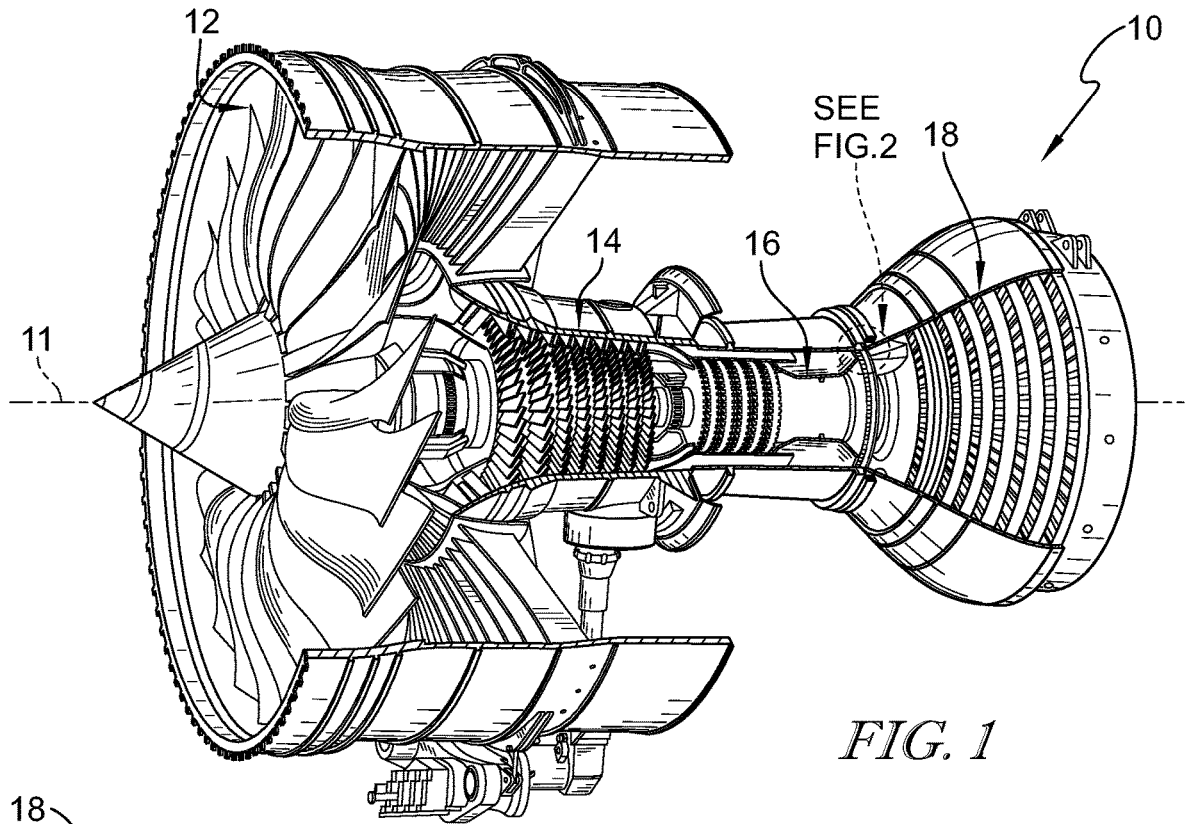
FIG. 1 is a cutaway view of a gas turbine engine that includes a fan, a compressor, a combustor, and a turbine assembly in accordance with the present disclosure that is adapted to extract work from hot combustion products received from the combustor.

For the purposes of promoting an understanding of the principles of the disclosure, reference will now be made to a number of illustrative embodiments illustrated in the drawings and specific language will be used to describe the same.

Figure 2:
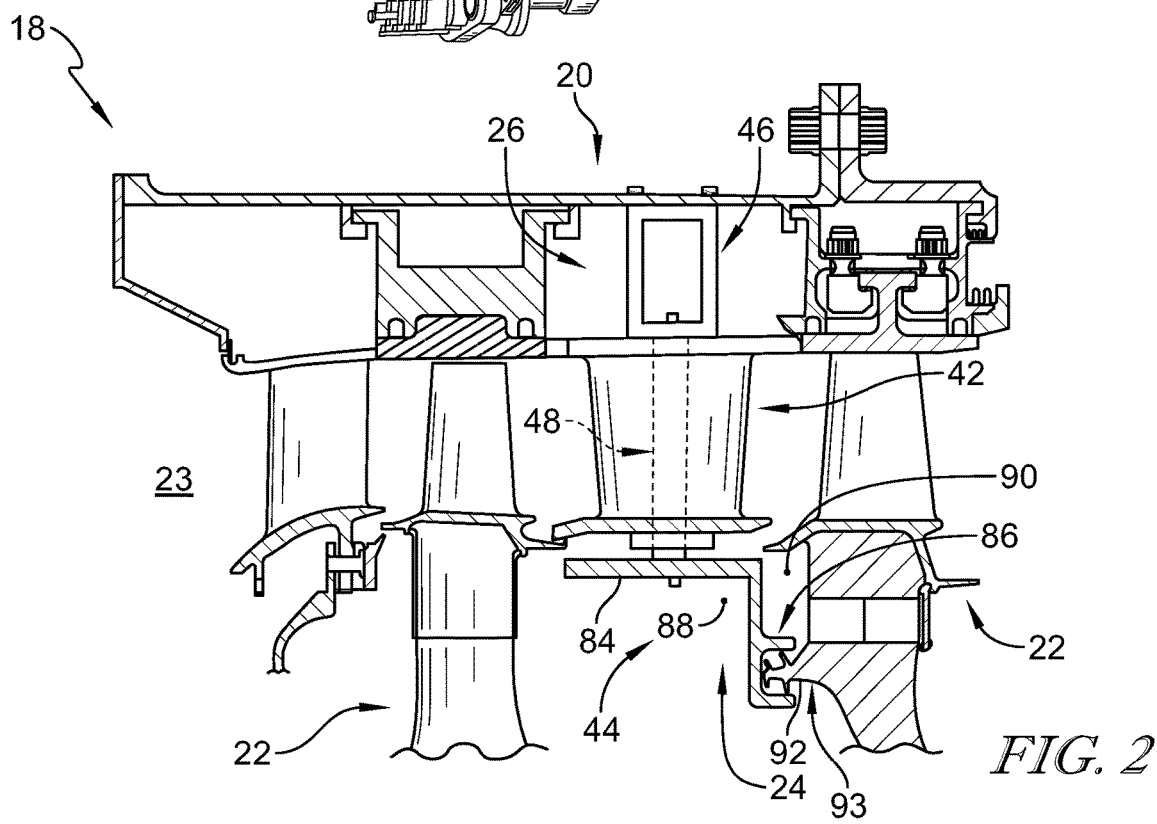
FIG. 2 is a cross sectional view of a portion of the turbine assembly of the gas turbine engine of FIG. 1 showing that the turbine assembly includes a turbine case, a plurality of turbine wheel assemblies, a vane stage made up of a vane with an airfoil and a inner vane seal land engaged by a seal rotor included in a turbine wheel assembly, and a vane-stage support that holds the vane stage in place relative to the turbine case.

A turbine assembly 18 according to the present disclosure is adapted for use in a gas turbine engine 10 as suggested in FIGS. 1 and 2. The gas turbine engine 10 includes a fan 12, a compressor 14, a combustor 16, and the turbine assembly 18. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

Figure 3:
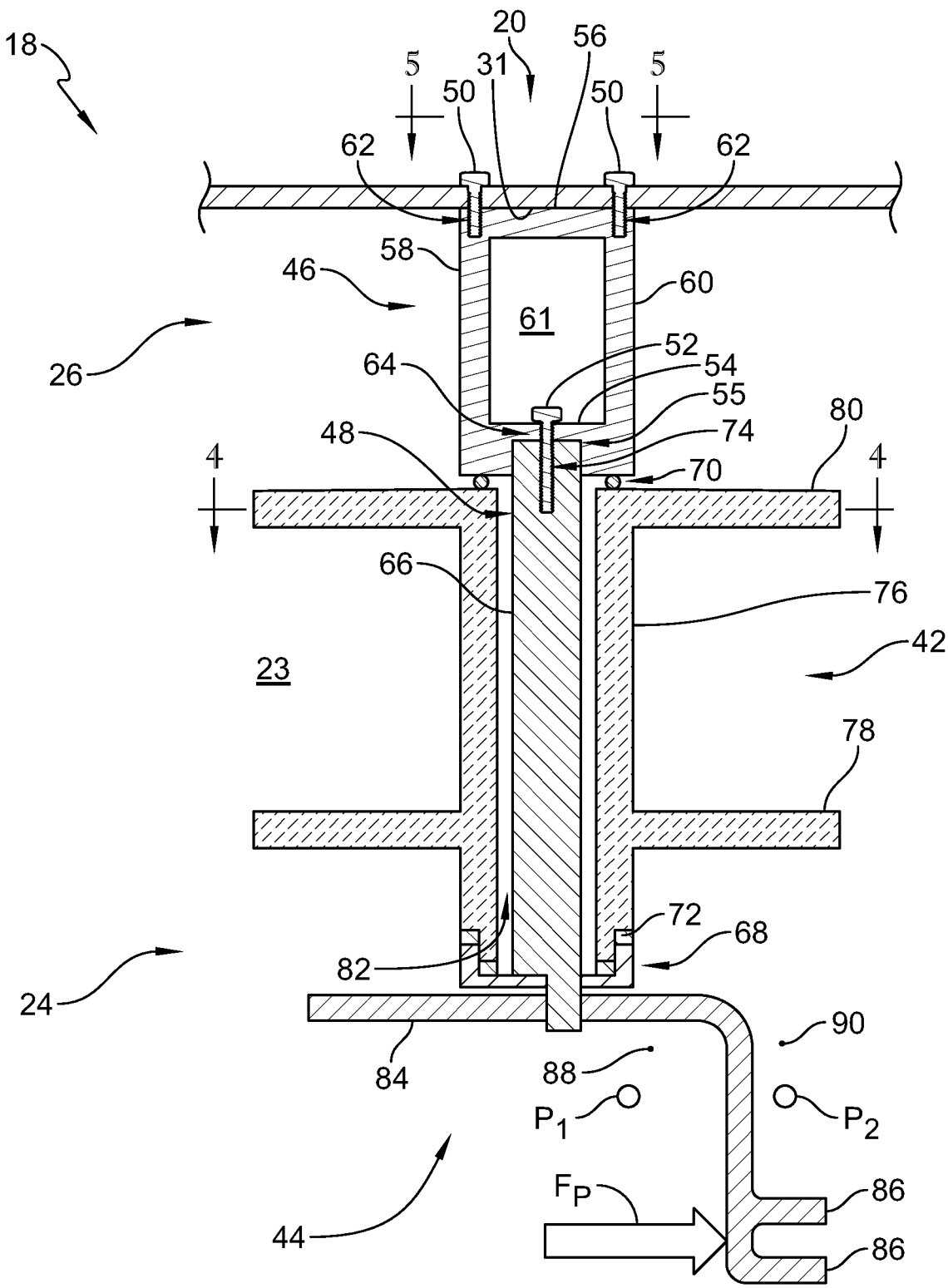
FIG. 3 is a detail view of the turbine assembly of FIG. 2 showing the vane-stage support includes a torsion box arranged radially inward of the case and radially outward of the vane stage and a spar that extends radially inwardly from the torsion box through the airfoil of the vane stage to the inner seal land to transfer aerodynamic loads from the vane stage to the spar and out through the torsion box and the turbine case.

The turbine assembly 18 includes a turbine case 20, a plurality of turbine wheel assemblies 22, a vane stage 24, and a vane-stage support 26 as shown in FIGS. 2 and 3. The turbine case 20 is generally arranged around a central reference axis 11. Each turbine wheel assembly 22 is configured to interact with the hot combustion gases from the combustor 16 and rotate about the center axis 11 of the gas turbine engine 10 to drive the compressor 14 and/or the fan 12. The vane stage 24 is located between the turbine wheel assemblies 22 and includes (a) a turbine vane 42 configured to redirect air moving through a primary gas path 23 of the gas turbine engine 10 and (b) an inner vane seal land 44 that is engaged by a seal rotor 92 to seal compartments 88, 90 within the turbine assembly 18. The vane-stage support 26 is configured to hold the turbine vane 42 and the inner vane seal land 44 included in the vane stage 24 in place relative to the turbine case 20.

The vane-stage support 26 provides a means for holding the vane stage 24 in a predetermined orientation relative to the turbine case 20 while also transferring aerodynamic loads applied to the vane stage 24 out through the turbine case 20. In the illustrative embodiments, the vane stage 26 is axially and radially located relative to the turbine case 20 using threaded fasteners. The vane stage 26 also engages the turbine vane 42 and the inner vane seal land 44 so that forces applied to the vane stage 24 are carried by the vane-stage support 26 and case 20 during use of the turbine assembly 18 in the gas turbine engine 10.

In the illustrative embodiment, the turbine vane 42 included in the vane stage 24 comprises ceramic matrix materials while the vane-stage support 26 comprises metallic materials. The ceramic matrix composite vane 42 is adapted to withstand high temperatures, but may have relatively low strength compared to the metallic vane-stage support 26. The vane-stage support 26 provides structural strength to the vane stage components 42, 44 by receiving the force loads, such as the aerodynamic loads applied to the vane 42 and the axial loads applied to the inner vane seal land 44, and transferring the loads directly from the vane-stage support 26 out through the casing 20.

Figure 4:
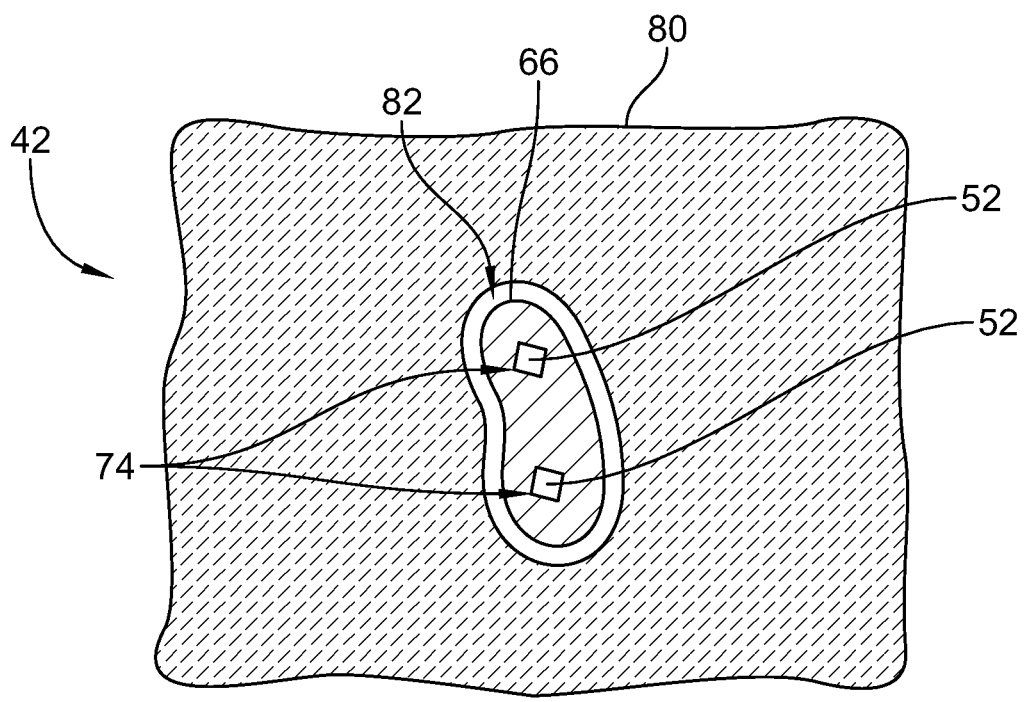
FIG. 4 is a cross sectional view of the turbine assembly of FIG. 3 taken along line 4-4 showing that torsion box to spar attachment interface, and showing that the vane-stage support further includes spar fasteners that extend radially through the torsion box and into the spar to couple the spar and the torsion box.
Figure 5:
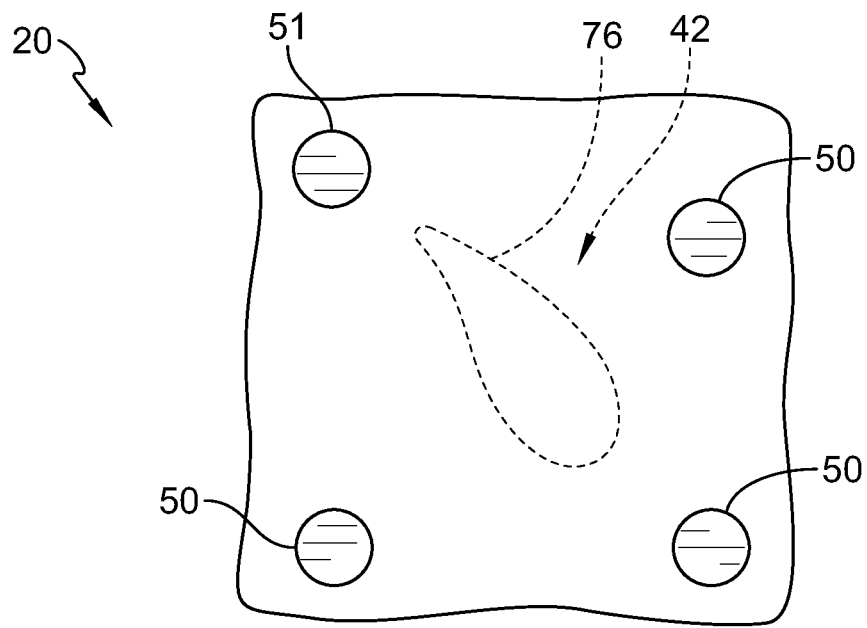
FIG. 5 is a top view of the turbine assembly of FIG. 3 taken along line 5-5 showing that the vane-stage support further includes case fasteners, and showing at least one case fastener is located so that the vane-stage support is arranged in a predetermined orientation relative to the turbine vane when the vane-stage support is secured into the turbine assembly.

The vane-stage support 26 includes a torsion box 46, a spar 48, a plurality of case fasteners 50, and a plurality of spar fasteners 52 as shown in FIGS. 3-5. The torsion box 46 is arranged radially inward of the turbine case 20 and radially outward of the turbine vane 42. The spar 48 extends radially inwardly from the torsion box 46 through the turbine vane 42 to the inner vane seal land 44. The turbine vane 42 and the inner vane seal land 44 are coupled to the spar 48 so that forces applied to the vane stage 24 are carried by the spar 48 to the torsion box 46 and ultimately the turbine case 20 during use of the turbine assembly 18 in the gas turbine engine 10. The case fasteners 50 extend through holes formed in the turbine case 20 and engage the torsion box 46 of the vane-stage support 26 to fix the torsion box 46 to the turbine case 20. The spar fasteners 52 fix the spar 48 to the torsion box 46.

The torsion box 46 is a roughly square sheet metal box that is resistant to torque and twisting forces. The torsion box 46 provides means for counteracting rolling applied to the turbine assembly 18 caused by aerodynamic loading of the vane stage 24 during use of the gas turbine engine 10. The inner vane seal land 44 creates a compartment seal 93 separating pressure zones P1 and P2 within the gas turbine engine 10 when the turbine assembly 18 is used in the gas turbine engine 10. The difference of pressure causes a pressure force Fp to act on the inner vane seal land 46, which results in an axial moment in the turbine assembly 18. The torsion box 46, resistant to such twisting or bending moments, transfers the axial moment resulting from the pressure force Fp out to the casing 20 strengthening the vane-stage support 26. The torsion box 46 is also arranged to transfer radial, axial, and circumferential loads to the case 20.

In the illustrative embodiment, the torsion box 46 is shaped to have a rectangular shape when viewed in a circumferential direction around the central reference axis 11. In other embodiments, the torsion box 46 may be have a square shape when view in the circumferential direction around the axis 11. In other embodiments, the torsion box 46 may have another topologically similar shape. The torsion box 46 may be formed using several different manufacturing methods and different materials. For example, the torsion box 46 may be made from sheet metal. In other embodiments, the torsion box 46 may be cast, forged, machined, or 3D printed using an additive layer manufacture.

The torsion box 46 includes radially inner and outer panels 54, 56 and axially forward and aft panels 58, 60 as shown in FIG. 3. The radially inner panel 54 is spaced radially inward of the radially outer panel 56 relative to the axis 11. The radially outer panel 56 engages a radially inner surface 31 of the turbine case 20. The axially aft panel 60 is spaced axially aft of the axially forward panel 58 relative to the axis 11. The radially inner and outer panels 54, 56 extend between and interconnect the axially forward and aft panels 58, 60 to form the rectangular shape of the torsion box 46.

The radially inner and outer panels 54, 56 and the axially forward and aft panels 58, 60 forming the rectangular shape of the torsion box 46 define a cavity 61 as shown in FIG. 3. The cavity 61 may be configured to be supplied cooling air from another section of the gas turbine engine 10, which may be used to cool the turbine assembly 18.

In some embodiments, the cavity 61 may be annular and extend around the axis 11. In other embodiments, each torsion box 46 spaced around the axis 11 may each be formed to include the cavity 61.

The panels 54, 58, 60 are formed to include tapped holes 62 as shown in FIG. 3. The tapped holes 62 extend radially inward through the radially outer panel 54 into the forward and aft panels 58, 60. The radially inner panel 56 includes holes 64. The holes 64 extend radially through the inner panel 56.

In the illustrative embodiment, the case fasteners 50 are threaded fasteners that engage the tapped holes 62 formed in the panels 54, 58, 60 that make up the rectangular shape of the torsion box 46. The case fasteners 50 extend into the radially outer panel 56 of the torsion box 46 at the forward panel 58 and the aft panel 60.

In the illustrative embodiment, the spar fasteners 52 are threaded fasteners that extend at least partway into the panel 56 of the torsion box 46 that defines at least part of the rectangular shape. The spar fasteners 52 extend radially through the radially inner panel 56 and partway into the spar 48.

The plurality of case fasteners 50 include at least one fastener 51 that is a locating case fastener 51 as shown in FIG. 5. The locating case fastener 51 is located so that the vane-stage support 26 is arranged in a predetermined orientation relative to the turbine vane 42 when secured into the turbine assembly 18. The plurality of fasteners 50 also transfer axial and circumferential loads from the vane stage 24 to the torsion box 46 and spar 48 out through the case 20.

The plurality of spar fasteners 52 includes at least one spar fastener 52. In the illustrative embodiments, the vane-stage support 26 includes at least two spar fasteners 52 as shown in FIG. 4. The spar fasteners 52 are axially spaced apart from one another in the illustrative embodiment.

The spar 58 includes a rod 66 and an inner load transfer collar 68 as shown in FIG. 3. The rod 66 extends radially through the turbine vane 42. In some embodiments, the rod 66 may be hollow and include cooling holes to transmit cooling air to the vane 42 and/or into the inter-disk cavity between the turbine wheels 22. The inner load transfer collar 68 is arranged radially inwardly of the turbine vane 42 and extends axially forward and aft of the rod 66 and contacts the turbine vane 42 a radially inner end of the turbine vane 42.

The inner load transfer collar 68 contacts the turbine vane 42 at the radially inner end of the turbine vane 42 to transfer aerodynamic loads applied to the vane 42 from the vane 42 to the spar 58. The inner load transfer collar 68 contacts the turbine vane 42 at the radially inner end of the vane 42 so that the loads are transferred from the vane 42 to the vane-stage support 26 outside of the primary gas path 23.

In the illustrative embodiment, the inner load transfer collar 68 is a separate component assembled onto the rod 66 and fixed to the rod 66 by a suitable fastener such as a screwed joint, collet arrangement, clamp, or other suitable fastener. In other embodiments, the inner load transfer collar 68 may be integrally formed with the rod 66 to form a one-piece integral component. In other embodiments, the inner load transfer collar 68 may be formed with a portion of the inner vane seal land 46.

In the illustrative embodiment, the rod 66 of the spar 48 is recessed into a pocket 55 formed in the radially inner panel 54. The portion of the rod 66 arranged in the pocket 55 is formed to include tapped holes 74 as shown in FIG. 3. The tapped holes 74 extend radially partway into the rod 66 at a radially outer end of the rod 66. In the illustrative embodiment, the rod 66 include at least two tapped holes 74 that are axially spaced apart like as shown in FIG. 4.

The vane-stage support 26 further includes an outer compliant seal 70 as shown in FIG. 3. The outer compliant seal 70 is arranged between the radially inner panel 54 and the turbine vane 42. The seal 70 is configured to seal between the torsion box 46 and the vane 42. The seal 70 is also configured to allow radial movement of the turbine vane 42 relative to the vane-stage support 26 in response to thermal growth mismatch between the vane 42 and the vane-stage support 26 caused by different coefficients of thermal expansion of the vane 42 and the support 26 during use of the turbine assembly 18.

In the illustrative embodiment, a compliant layer 72 is arranged between the radially inner end of the turbine vane 42 and the inner load transfer collar 68 like as shown in FIG. 3. The compliant layer 72 is configured to seal between the radially inner end of the turbine vane 42 and the inner load transfer collar 68. The compliant layer 72 is also configured to allow radial movement of the turbine vane 42 relative to the vane-stage support 26 in response to thermal growth mismatch between the vane 42 and the vane-stage support 26 caused by different coefficients of thermal expansion of the vane 42 and the support 26 during use of the turbine assembly 18.

Turning again to the vane stage 24, the turbine vane 42 includes the airfoil 76, an inner end wall 78, and an outer end wall 80 as shown in FIG. 3. The inner end wall 78 extends from the airfoil 76 to define an inner boundary of the primary gas path 23. The outer platform 80 is spaced radially outwardly from the inner platform 76 and extends from the airfoil 76 to define an outer boundary of the primary gas path 23. The airfoil 76 extends between and interconnects the outer end wall 80 and the inner end wall 78. The airfoil 76 is shaped to redirect air moving along the primary gas path 23. In the illustrative embodiment, the rod 66 of the spar 48 extends radially inwardly from the torsion box 46 through the airfoil 76 of the turbine vane 42 to the inner vane seal land 44.

The airfoil 76 is also shaped to include a vane cavity 82 extending radially through the airfoil 76 and opens at the inner and outer end walls 78, 80. The rod 66 of the spar 48 extends from the torsion box 46 radially through the cavity 82 of the airfoil 76 of the turbine vane 42 to the inner vane seal land 44.

In the illustrative embodiment, the outer end wall 80, inner end wall 78, and the airfoil 76 of the vane 42 are integrally formed from ceramic matrix composite materials such that the outer end wall 80, inner end wall 78, and the airfoil 76 are included in a one-piece vane component as shown in FIGS. 2 and 3. In other embodiments, the outer end wall 80, inner end wall 78, and the airfoil 76 may be formed as separate components.

The inner vane seal land 44 includes a seal panel 84 and seal lands 86 as shown in FIGS. 2 and 3. The seal panel 84 divides the inter-disk cavity into axially adjacent compartments 88, 90 within the turbine assembly 18. The seal lands 86 extend axially aft and away from the seal panel 84. At least one seal land 86 is engaged by a rotatable seal element 92 of the turbine wheel 22 as shown in FIG. 2. In the illustrative embodiment, both seal lands 86 are engaged with the rotating seal element 92 to form a compartment seal 93 between the upstream and downstream turbine wheel assemblies 22.

The compartment seal 93 between the upstream and downstream turbine wheel assemblies 22 results in a first pressure P1 on the upstream turbine wheel side and a second pressure P2 on the downstream turbine wheel side. In the illustrative embodiment, the first pressure P1 is greater than the second pressure P2 resulting in a difference of pressure on either side of the inner vane seal land 46. The difference of pressure causes the pressure force Fp to act on the inner vane seal land 46 as shown in FIG. 3. The pressure force Fp results in an axial moment in the turbine assembly 18.

Another embodiment of a turbine assembly 218 in accordance with the present disclosure is shown in FIG. 6. The turbine assembly 218 is substantially similar to the turbine assembly 18 shown in FIGS. 1-3 and described herein. Accordingly, similar reference numbers in the 200 series indicate features that are common between the turbine assembly 18 and the turbine assembly 218. The description of the turbine assembly 18 is incorporated by reference to apply to the turbine assembly 218, except in instances when it conflicts with the specific description and the drawings of the turbine assembly 218.

The turbine assembly 218 includes a turbine case 220, a vane stage 224, and a vane-stage support 226 as shown in FIG. 6. The vane stage 224 is located between the turbine wheel assemblies 22 and includes a turbine vane 242 configured to redirect air received from an upstream turbine wheel assembly 22 moving through a primary gas path 23 of the gas turbine engine 10 toward a downstream turbine wheel assembly 22. The vane-stage support 226 is configured to hold the turbine vane 242 and an inner vane seal land 244 included in the vane stage 224 in place relative to the turbine case 220.

The vane stage 224 includes the turbine vane 242 and the inner vane seal land 244 as shown in FIG. 6. The turbine vane 242 is shaped to form an airfoil 276 that extends across the primary gas path 23 of the gas turbine engine 10. The inner vane seal land 244 is located radially inward of the turbine vane 242 outside of the primary gas path 23. The inner vane seal land 244 is configured to be engaged by the rotating component 92 to create the seal 93 that separates pressure zones P1, P2 within the gas turbine engine 10 when the turbine assembly 218 is used in the gas turbine engine 10.

The turbine vane 242 includes the airfoil 276, an inner end wall 278, and an outer end wall 280 as shown in FIG. 6. The inner end wall 278 extends from the airfoil 276 to define an inner boundary of the primary gas path 23. The outer end wall 280 is spaced radially outwardly from the inner platform 278 and extends from the airfoil 276 to define an outer boundary of the primary gas path 23. The airfoil 276 extends between and interconnects the outer end wall 80 and the inner end wall 278.

The vane-stage support 226 includes a torsion box 246, a spar 248, a plurality of case fasteners 250, and a plurality of spar fasteners 252 as shown in FIG. 6. The torsion box 246 is arranged radially inward of the turbine case 220 and radially outward of the turbine vane 42. The spar 248 extends radially inwardly from the torsion box 246 through the turbine vane 242 to the inner vane seal land 244. The turbine vane 242 and the inner vane seal land 244 are coupled to the spar 248 so that forces applied to the vane stage 224 are carried by the spar 248 to the torsion box 246 and ultimately the turbine case 220 during use of the turbine assembly 218 in the gas turbine engine 10. The case fasteners 250 extend through holes formed in the turbine case 220 and engage the torsion box 246 of the vane-stage support 226 to fix the torsion box 246 to the turbine case 220. The spar fasteners 252 fix the spar 248 to the torsion box 246.

The torsion box 246 includes radially inner and outer panels 254, 256 and axially forward and aft panels 258, 260 as shown in FIG. 6. The radially inner panel 254 is spaced radially inward of the radially outer panel 256 relative to the axis 11 and engages a radially inner surface 231 of the turbine case 220. The axially aft panel 260 is spaced axially aft of the axially forward panel 258 relative to the axis 11. The radially inner and outer panels 254, 256 extend between and interconnect the axially forward and aft panels 258, 260 to form the rectangular shape of the torsion box 246.

The rectangular shape provided by the torsion box 246 of the vane-stage support 226 extends axially forward or aft of the outer platform 280. The forward panel 258 is located forward of a forward end of the outer platform 280. The aft panel 260 is located aft of an aft end of the outer platform 280. The radially inner and outer panels 254, 256 extend between and interconnect the axially forward and aft panels 258, 260.

The radially inner and outer panels 254, 256 and the axially forward and aft panels 258, 260 forming the rectangular shape of the torsion box 46 define a cavity 261 as shown in FIG. 6. The cavity 261 may be configured to be supplied cooling air from another section of the gas turbine engine 10, which may be used to cool the turbine assembly 218.

The vane-stage support 226 further includes an outer compliant seal 270 as shown in FIG. 6. The outer compliant seal 270 is arranged between the radially inner panel 254 and the turbine vane 242. The seal 270 is configured to seal between the torsion box 246 and the vane 242. The seal 270 is also configured to allow radial movement of the turbine vane 242 relative to the vane-stage support 226 in response to thermal growth mismatch between the vane 242 and the vane-stage support 226 caused by different coefficients of thermal expansion of the vane 242 and the support 226 during use of the turbine assembly 218.

In the illustrative embodiment, the seal 270 is located at the axially forward and aft ends of the outer end wall 280 between the vane 242 and the torsion box 246. In other embodiments, the seal 270 may be arranged and/or located axially inward of the forward and aft ends of the outer end wall 280 toward the torsion box 246 to spar 248 connection.

Another embodiment of a turbine assembly 318 in accordance with the present disclosure is shown in FIG. 7. The turbine assembly 318 is substantially similar to the turbine assembly 18 shown in FIGS. 1-3 and described herein. Accordingly, similar reference numbers in the 300 series indicate features that are common between the turbine assembly 18 and the turbine assembly 318. The description of the turbine assembly 18 is incorporated by reference to apply to the turbine assembly 318, except in instances when it conflicts with the specific description and the drawings of the turbine assembly 318.

The turbine assembly 318 includes a turbine case 320, a vane stage 324, and a vane-stage support 326 as shown in FIG. 7. The vane stage 324 is located between the turbine wheel assemblies 22 and includes a turbine vane 342 configured to redirect air received from an upstream turbine wheel assembly 22 moving through a primary gas path 23 of the gas turbine engine 10 toward a downstream turbine wheel assembly 22. The vane-stage support 326 is configured to hold the turbine vane 342 and an inner vane seal land 346 included in the vane stage 324 in place relative to the turbine case 320.

The vane stage 324 includes the turbine vane 342 and the inner vane seal land 344 as shown in FIG. 7. The turbine vane 342 is shaped to form an airfoil 376 that extends across the primary gas path 23 of the gas turbine engine 10. The inner vane seal land 344 is located radially inward of the turbine vane 342 outside of the primary gas path 23. The inner vane seal land 344 is configured to be engaged by the rotating component 92 to create the seal 93 that separates pressure zones P1, P2 within the gas turbine engine 10 when the turbine assembly 318 is used in the gas turbine engine 10.

The turbine vane 342 includes the airfoil 376, an inner end wall 378, and an outer end wall 380 as shown in FIG. 7. The inner end wall 378 extends from the airfoil 376 to define an inner boundary of the primary gas path 23. The outer end wall 380 is spaced radially outwardly from the inner platform 378 and extends from the airfoil 376 to define an outer boundary of the primary gas path 23.

The vane-stage support 326 includes a torsion box 346, a spar 348, a plurality of case fasteners 350, and a plurality of spar fasteners 352 as shown in FIG. 7. The torsion box 346 is arranged radially inward of the turbine case 320 and radially outward of the turbine vane 342. The spar 348 extends radially inwardly from the torsion box 346 through the turbine vane 342 to the inner vane seal land 344. The turbine vane 342 and the inner vane seal land 344 are coupled to the spar 348 so that forces applied to the vane stage 324 are carried by the spar 348 to the torsion box 346 and ultimately the turbine case 320 during use of the turbine assembly 318 in the gas turbine engine 10. The case fasteners 350 extend through holes formed in the turbine case 320 and engage the torsion box 346 of the vane-stage support 326 to fix the torsion box 346 to the turbine case 320. The spar fasteners 352 fix the spar 348 to the torsion box 346.

The torsion box 346 includes radially inner and outer panels 354, 356 and axially forward and aft panels 358, 360 as shown in FIG. 7. The radially inner panel 354 is spaced radially inward of the radially outer panel 356 relative to the axis 11 and engages a radially inner surface 331 of the turbine case 320. The axially aft panel 360 is spaced axially aft of the axially forward panel 358 relative to the axis 11. The radially inner and outer panels 354, 356 extend between and interconnect the axially forward and aft panels 358, 360 to form the rectangular shape of the torsion box 346.

The rectangular shape provided by the torsion box 346 of the vane-stage support 326 extends axially forward or aft of the outer platform 380. The forward panel 358 is located forward of a forward end of the outer platform 380. The aft panel 360 is located aft of an aft end of the outer platform 380. The radially inner and outer panels 354, 356 extend between and interconnect the axially forward and aft panels 358, 360.

The vane-stage support 326 further includes an outer compliant layer 370 as shown in FIG. 7. The outer compliant layer 370 is arranged between the radially inner panel 354 and the turbine vane 342. In the illustrative embodiment, the seal 370 seal extends along a radially inner surface of the panel 354 and the radially outer surface of the outer end wall 380 and interfaces both surfaces to seal between the panel 354 and the end wall 380.

The seal 370 is configured to seal between the torsion box 346 and the vane 342. The seal 370 is also configured to allow radial movement of the turbine vane 344 relative to the vane-stage support 326 in response to thermal growth mismatch between the vane 342 and the vane-stage support 326 caused by different coefficients of thermal expansion of the vane 342 and the support 326 during use of the turbine assembly 318.

Another embodiment of a turbine assembly 418 in accordance with the present disclosure is shown in FIG. 8. The turbine assembly 418 is substantially similar to the turbine assembly 18 shown in FIGS. 1-3 and described herein. Accordingly, similar reference numbers in the 400 series indicate features that are common between the turbine assembly 18 and the turbine assembly 418. The description of the turbine assembly 18 is incorporated by reference to apply to the turbine assembly 418, except in instances when it conflicts with the specific description and the drawings of the turbine assembly 418.

The turbine assembly 418 includes a turbine case 420, a vane stage 424, and a vane-stage support 426 as shown in FIG. 8. The vane stage 424 is located between the turbine wheel assemblies 22 and includes a turbine vane 424 configured to redirect air received from an upstream turbine wheel assembly 22 moving through a primary gas path 23 of the gas turbine engine 10 toward a downstream turbine wheel assembly 22. The vane-stage support 426 is configured to hold the turbine vane 424 and an inner vane seal land 446 included in the vane stage 424 in place relative to the turbine case 420.

The vane stage 424 includes the turbine vane 422 and the inner vane seal land 444 as shown in FIG. 8. The turbine vane 422 is shaped to form an airfoil 476 that extends across the primary gas path 23 of the gas turbine engine 10. The inner vane seal land 444 is located radially inward of the turbine vane 422 outside of the primary gas path 23. The inner vane seal land 444 is configured to be engaged by the rotating component 92 to create the seal 93 that separates pressure zones P1, P2 within the gas turbine engine 10 when the turbine assembly 418 is used in the gas turbine engine 10.

The turbine vane 422 includes the airfoil 476, an inner end wall 478, and an outer end wall 480 as shown in FIG. 8. The inner end wall 478 extends from the airfoil 476 to define an inner boundary of the primary gas path 23. The outer end wall 480 is spaced radially outwardly from the inner platform 478 and extends from the airfoil 476 to define an outer boundary of the primary gas path 23. The airfoil 476 extends between and interconnects the outer end wall 80 and the inner end wall 478.

The radially outer end of the airfoil 476 is shaped to include an extension 477 as shown in FIG. 8. The extension 477 extends radially outwardly from the airfoil 276 and engages a portion of the vane-stage support 446 to located the turbine vane 442 relative to the vane-stage support 426 and transfer aerodynamic loads through the vane-stage support 426.

The vane-stage support 426 includes a torsion box 446, a spar 448, a plurality of case fasteners 450, and a plurality of spar fasteners 452 as shown in FIG. 8. The torsion box 446 is arranged radially inward of the turbine case 420 and radially outward of the turbine vane 422. The spar 448 extends radially inwardly from the torsion box 446 through the turbine vane 422 to the inner vane seal land 444. The turbine vane 422 and the inner vane seal land 244 are coupled to the spar 448 so that forces applied to the vane stage 424 are carried by the spar 448 to the torsion box 446 and ultimately the turbine case 420 during use of the turbine assembly 418 in the gas turbine engine 10. The case fasteners 450 extend through holes formed in the turbine case 200 and engage the torsion box 446 of the vane-stage support 426 to fix the torsion box 246 to the turbine case 200. The spar fasteners 452 fix the spar 448 to the torsion box 46.

The torsion box 446 includes radially inner and outer panels 454, 456 and axially forward and aft panels 458, 460 as shown in FIG. 8. The radially inner panel 454 is spaced radially inward of the radially outer panel 456 relative to the axis 11 and engages a radially inner surface 431 of the turbine case 200. The axially aft panel 460 is spaced axially aft of the axially forward panel 258 relative to the axis 11. The radially inner and outer panels 454, 456 extend between and interconnect the axially forward and aft panels 458, 460 to form the rectangular shape of the torsion box 446.

The radially inner panel 454 of the torsion box 446 is shaped to include a forward axial locating shoulder 494 and an aft locating axial locating shoulder 496 as shown in FIG. 8. The forward axial locating shoulder 494 is located radially inward of the rectangular shape. The aft axial locating shoulder 496 is located radially inward of the rectangular shape and is spaced axially aft of the forward axial locating shoulder 494.

The forward axial locating shoulder 494 engages a forward facing side of the turbine vane 442 to block forward movement of the turbine vane 422 relative to the torsion box 446. The aft axial locating shoulder 496 engages an aft facing side of the turbine vane 422 to block aftward movement of the turbine vane 422 relative to the torsion box 446. In the illustrative embodiment, the forward locating shoulder 494 engages the extension 477 of the turbine vane 422 at the forward facing side of the turbine vane 422 and the aft locating shoulder 496 engages the extension 477 at the aft facing side of the turbine vane 422.

The locating shoulders 494, 496 and the extension 477 of the airfoil 476 may help transfer aerodynamic loading of the vane 422 as well. The arrangement of the shoulders 494, 496 and the extension 477 also may help seal the gap between the ceramic matrix composite vane 422 and the torsion box 446 preventing leakage.

Another embodiment of a turbine assembly 518 in accordance with the present disclosure is shown in FIG. 9. The turbine assembly 518 is substantially similar to the turbine assembly 18 shown in FIGS. 1-3 and described herein. Accordingly, similar reference numbers in the 500 series indicate features that are common between the turbine assembly 18 and the turbine assembly 518. The description of the turbine assembly 18 is incorporated by reference to apply to the turbine assembly 518, except in instances when it conflicts with the specific description and the drawings of the turbine assembly 518.

The turbine assembly 518 includes a turbine case 520, a vane stage 524, and a vane-stage support 526 as shown in FIG. 9. The vane stage 524 is located between the turbine wheel assemblies 22 and includes a turbine vane 544 configured to redirect air received from an upstream turbine wheel assembly 22 moving through a primary gas path 23 of the gas turbine engine 10 toward a downstream turbine wheel assembly 22. The vane-stage support 526 is configured to hold the turbine vane 544 and an inner vane seal land 546 included in the vane stage 524 in place relative to the turbine case 520.

The turbine case 520 includes a forward casing 528 and an aft casing 530 as shown in FIG. 9. The forward casing 528 includes a forward annular shell 532 and a forward flange 534 that extends radially outwardly from the annular shell 532. The aft casing 530 includes an aft annular shell 538 and an aft flange 540 that extends radially outwardly from the annular shell 538. In the illustrative embodiment, the forward casing 528 and the aft casing 530 are axially spaced apart to form a mount aperture 537 therebetween that receives a portion of the vane-stage support 526.

The vane stage 524 includes the turbine vane 542 and the inner vane seal land 544 as shown in FIG. 9. The turbine vane 542 is shaped to form an airfoil 576 that extends across the primary gas path 23 of the gas turbine engine 10. The inner vane seal land 544 is located radially inward of the turbine vane 542 outside of the primary gas path 23. The inner vane seal land 544 is configured to be engaged by the rotating component 92 to create the seal 93 that separates pressure zones P1, P2 within the gas turbine engine 10 when the turbine assembly 518 is used in the gas turbine engine 10.

The turbine vane 542 includes the airfoil 576, an inner end wall 578, and an outer end wall 580 as shown in FIG. 9. The inner end wall 578 extends from the airfoil 576 to define an inner boundary of the primary gas path 23. The outer end wall 580 is spaced radially outwardly from the inner platform 578 and extends from the airfoil 576 to define an outer boundary of the primary gas path 23. The airfoil 576 extends between and interconnects the outer end wall 80 and the inner end wall 578.

The radially outer end of the airfoil 576 is shaped to include an extension 577 as shown in FIG. 8. The extension 577 extend radially outwardly from the airfoil 576 and engages a portion of the vane-stage support 546.

The vane-stage support 526 includes a torsion box 546, a spar 548, a plurality of case fasteners 550, and a plurality of spar fasteners 552 as shown in FIG. 9. The torsion box 546 is arranged radially inward of the turbine case 520 and radially outward of the turbine vane 542. The spar 548 extends radially inwardly from the torsion box 546 through the turbine vane 542 to the inner vane seal land 544. The turbine vane 542 and the inner vane seal land 544 are coupled to the spar 548 so that forces applied to the vane stage 524 are carried by the spar 548 to the torsion box 546 and ultimately the turbine case 520 during use of the turbine assembly 518 in the gas turbine engine 10. The case fasteners 550 extend through flanges 534, 540 of the turbine case 520 and engage the torsion box 546 of the vane-stage support 526 to fix the torsion box 546 to the turbine case 520. The spar fasteners 552 fix the spar 448 to the torsion box 46.

The torsion box 546 includes radially inner and outer panels 554, 556 and axially forward and aft panels 558, 560 as shown in FIG. 9. The radially inner panel 554 is spaced radially inward of the radially outer panel 556 relative to the axis 11. The axially aft panel 560 is spaced axially aft of the axially forward panel 258 relative to the axis 11. The radially inner and outer panels 554, 556 extend between and interconnect the axially forward and aft panels 558, 560 to form the rectangular shape of the torsion box 546.

The radially inner panel 554 of the torsion box 546 is shaped to include a forward axial locating shoulder 594 and an aft locating axial locating shoulder 596 as shown in FIG. 9. The forward axial locating shoulder 594 is located radially inward of the rectangular shape. The aft axial locating shoulder 596 is located radially inward of the rectangular shape and is spaced axially aft of the forward axial locating shoulder 594.

The forward axial locating shoulder 594 engages a forward facing side of the turbine vane 542 to block forward movement of the turbine vane 542 relative to the torsion box 546. The aft axial locating shoulder 596 engages an aft facing side of the turbine vane 542 to block aftward movement of the turbine vane 542 relative to the torsion box 546. In the illustrative embodiment the forward locating shoulder 594 engages the extension 577 of the turbine vane 542 at the forward facing side of the turbine vane 542 and the aft locating shoulder 495 engages the extension 577 at the aft facing side of the turbine vane 542.

The radially outer panel 556 of the torsion box 546 is shaped to include at least one case coupling flange 597, 598 as shown in FIG. 9. In the illustrative embodiment, the radially outer panel 556 of the torsion box 546 is shaped to include a forward case coupling flange 597 and an aft case coupling flange 598. The case coupling flanges 597, 598 extend radially outward from the radially outer panel 556 through the mount aperture 537 outside of the turbine case 520.

The radially inner and outer panels 554, 556 and the axially forward and aft panels 558, 560 forming the rectangular shape of the torsion box 546 define a cavity 561 as shown in FIG. 9. The cavity 561 may be configured to be supplied cooling air from another section of the gas turbine engine 10, which may be used to cool the turbine assembly 518.

In the illustrative embodiment, the case coupling flanges 597, 598 are axially spaced apart and form a gap therebetween that opens into the cavity 561. The gap may be used to supply cooling air to the cavity 561. In other embodiments, the radially outer panel 556 may only include a single coupling flange that extends from the radially outer panel 556 out through the mount aperture 537.

In the illustrative embodiment, the case fasteners 550 extend axially into the aft flange 540 of the case 520, through the case coupling flanges 597, 598 of the torsion box 546, and into the forward flange 534 of the case 520. In some embodiments, the case fasteners 550 may include more than one case fastener 550 spaced radially inward from the case fastener 550 such that there is more than one case fastener 550 at each circumferential location around the axis 11.

Figures 10, 11:
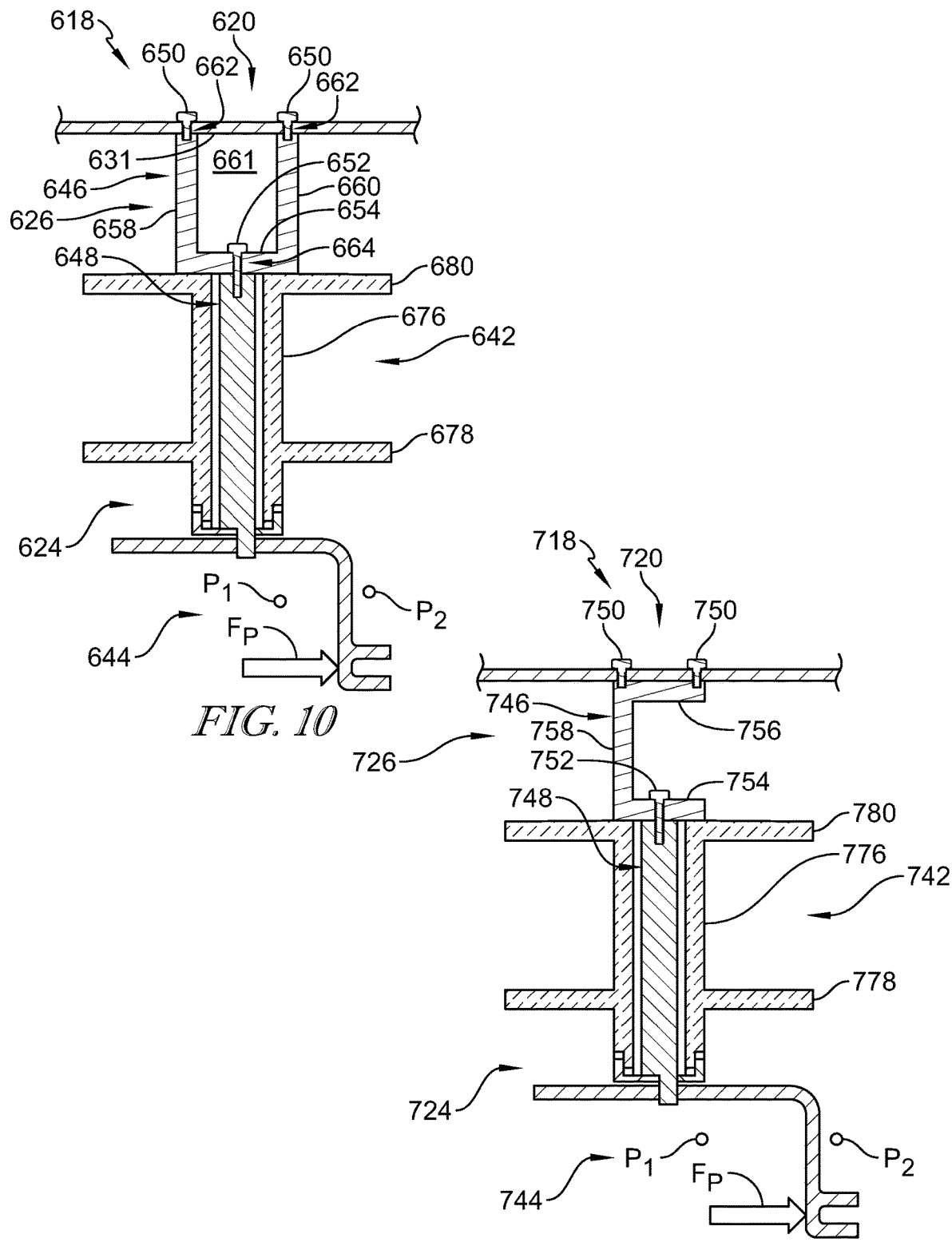
FIG. 10 is a detail view of another embodiment of a vane-stage support to be included in the turbine assembly of FIG. 2 showing that the vane-stage support includes a torsion box and a spar that extends from the torsion box radially through the airfoil of the turbine vane stage and couples to the inner vane seal land to transmit forces applied to the vane stage to the torsion box and out through the turbine case, and showing the torsion box is formed to include only three panels to form a U-shape cross section.
FIG. 11 is a detail view of another embodiment of a vane-stage support to be included in the turbine assembly of FIG. 2 showing that the vane-stage support includes a torsion coupling and a spar that extends from the torsion coupling radially through the airfoil of the turbine vane stage and couples to the inner vane seal land to transmit forces applied to the vane stage to the torsion box and out through the turbine case, and showing the torsion coupling is formed to include only three panels to form a C-shape cross section.

Another embodiment of a turbine assembly 618 in accordance with the present disclosure is shown in FIG. 10. The turbine assembly 618 is substantially similar to the turbine assembly 18 shown in FIGS. 1-3 and described herein. Accordingly, similar reference numbers in the 600 series indicate features that are common between the turbine assembly 18 and the turbine assembly 618. The description of the turbine assembly 18 is incorporated by reference to apply to the turbine assembly 618, except in instances when it conflicts with the specific description and the drawings of the turbine assembly 618.

The turbine assembly 618 includes a turbine case 620, a vane stage 624, and a vane-stage support 626 as shown in FIG. 10. The vane stage 624 is located between the turbine wheel assemblies 22 and includes a turbine vane 642 configured to redirect air received from an upstream turbine wheel assembly 22 moving through a primary gas path 23 of the gas turbine engine 10 toward a downstream turbine wheel assembly 22. The vane-stage support 626 is configured to hold the turbine vane 642 and an inner vane seal land 646 included in the vane stage 624 in place relative to the turbine case 620.

The vane stage 624 includes the turbine vane 642 and the inner vane seal land 644 as shown in FIG. 10. The turbine vane 642 is shaped to form an airfoil 676 that extends across the primary gas path 23 of the gas turbine engine 10. The inner vane seal land 644 is located radially inward of the turbine vane 642 outside of the primary gas path 23. The inner vane seal land 644 is configured to be engaged by the rotating component 92 to create the seal 93 that separates pressure zones P1, P2 within the gas turbine engine 10 when the turbine assembly 618 is used in the gas turbine engine 10.

The turbine vane 642 includes the airfoil 676, an inner end wall 678, and an outer end wall 680 as shown in FIG. 10. The inner end wall 678 extends from the airfoil 676 to define an inner boundary of the primary gas path 23. The outer end wall 680 is spaced radially outwardly from the inner platform 678 and extends from the airfoil 676 to define an outer boundary of the primary gas path 23. The airfoil 676 extends between and interconnects the outer end wall 680 and the inner end wall 678.

The vane-stage support 626 includes a torsion box 646, a spar 648, a plurality of case fasteners 650, and a plurality of spar fasteners 652 as shown in FIG. 10. The torsion box 646 is arranged radially inward of the turbine case 620 and radially outward of the turbine vane 642. The spar 648 extends radially inwardly from the torsion box 646 through the turbine vane 642 to the inner vane seal land 644. The turbine vane 642 and the inner vane seal land 644 are coupled to the spar 648 so that forces applied to the vane stage 624 are carried by the spar 648 to the torsion box 646 and ultimately the turbine case 620 during use of the turbine assembly 618 in the gas turbine engine 10. The case fasteners 650 extend through holes formed in the turbine case 620 and engage the torsion box 646 of the vane-stage support 626 to fix the torsion box 646 to the turbine case 620. The spar fasteners 652 fix the spar 648 to the torsion box 646.

The torsion box 646 includes a radially inner panel 654, an axially forward panel 658, and an axially aft panel 660 as shown in FIG. 10. The radially inner panel 654 is spaced radially inward of the turbine case 620 relative to the axis 11. The axially forward and aft panels 658, 660 extend radially outward toward the case 620 from the radially inner panel 654 and engage a radially inner surface 631 of the turbine case 620 to form a U-shape of the torsion box 646 when view circumferentially around the axis 11.

In the illustrative embodiment, the radially inner panel 654 engages the outer end wall 680 of the turbine vane 642. The radially inner panel 654 engages the end wall 680 to reduce or prevent vane tilting of the turbine vane 642.

The radially inner panel 654 and the axially forward and aft panels 658, 660 forming the rectangular shape of the torsion box 646 define a cavity 661 as shown in FIG. 10. The radially inner panel 654, the turbine case 620, and the axially forward and aft panels 658, 660, define the cavity 661. The cavity 661 may be configured to be supplied cooling air from another section of the gas turbine engine 10, which may be used to cool the turbine assembly 518.

Each of the forward and aft panels 658, 660 are formed to include tapped holes 662. The tapped holes 662 extend radially inward through into the forward and aft panels 658, 660. The radially inner panel 654 includes holes 664. The holes 664 extend radially through the inner panel 654 and into the spar 648. In the illustrative embodiment, the portion of the hole 664 extending through the inner panel 654 forms a clearance hole that does not engage the spar fasteners 652.

In the illustrative embodiment, the case fasteners 650 are threaded fasteners that engage the tapped holes 662 formed in the panels 658, 660 that make up the U-shape of the torsion box 646. The case fasteners 650 extend through the turbine case 620 and into a radially outer ends of the forward and aft panels 658, 660 of the torsion box 646 that engages the turbine case 620.

The spar fastener 652 is a threaded fastener that extends through the clearance hole portion of the hole 664 and engages the tapped portion of the hole 664 formed in the spar 648. The spar fastener 652 extends radially through the clearance hole portion of the inner panel 654 and into the tapped hole 664 extending into the spar 648.

Another embodiment of a turbine assembly 718 in accordance with the present disclosure is shown in FIG. 11. The turbine assembly 718 is substantially similar to the turbine assembly 18 shown in FIGS. 1-3 and described herein. Accordingly, similar reference numbers in the 700 series indicate features that are common between the turbine assembly 18 and the turbine assembly 718. The description of the turbine assembly 18 is incorporated by reference to apply to the turbine assembly 718, except in instances when it conflicts with the specific description and the drawings of the turbine assembly 718.

The turbine assembly 718 includes a turbine case 720, a vane stage 724, and a vane-stage support 726 as shown in FIG. 11. The vane stage 624 is located between the turbine wheel assemblies 22 and includes a turbine vane 742 configured to redirect air received from an upstream turbine wheel assembly 22 moving through a primary gas path 23 of the gas turbine engine 10 toward a downstream turbine wheel assembly 22. The vane-stage support 726 is configured to hold the turbine vane 742 and an inner vane seal land 744 included in the vane stage 724 in place relative to the turbine case 720.

The vane stage 724 includes the turbine vane 742 and the inner vane seal land 744 as shown in FIG. 11. The turbine vane 742 is shaped to form an airfoil 776 that extends across the primary gas path 23 of the gas turbine engine 10. The inner vane seal land 744 is located radially inward of the turbine vane 742 outside of the primary gas path 23. The inner vane seal land 744 is configured to be engaged by the rotating component 92 to create the seal 93 that separates pressure zones P1, P2 within the gas turbine engine 10 when the turbine assembly 718 is used in the gas turbine engine 10.

The turbine vane 742 includes the airfoil 776, an inner end wall 778, and an outer end wall 780 as shown in FIG. 11. The inner end wall 778 extends from the airfoil 776 to define an inner boundary of the primary gas path 23. The outer end wall 780 is spaced radially outwardly from the inner platform 778 and extends from the airfoil 776 to define an outer boundary of the primary gas path 23. The airfoil 776 extends between and interconnects the outer end wall 780 and the inner end wall 778.

The vane-stage support 726 includes a torsion box 746, a spar 748, a plurality of case fasteners 750, and a plurality of spar fasteners 752 as shown in FIG. 11. The torsion box 746 is arranged radially inward of the turbine case 720 and radially outward of the turbine vane 742. The spar 748 extends radially inwardly from the torsion box 746 through the turbine vane 742 to the inner vane seal land 744. The turbine vane 742 and the inner vane seal land 744 are coupled to the spar 748 so that forces applied to the vane stage 724 are carried by the spar 748 to the torsion box 746 and ultimately the turbine case 720 during use of the turbine assembly 718 in the gas turbine engine 10. The case fasteners 750 extend through holes formed in the turbine case 720 and engage the torsion box 746 of the vane-stage support 726 to fix the torsion box 746 to the turbine case 720. The spar fasteners 752 fix the spar 748 to the torsion box 746.

The torsion box 746 includes a radially inner panel 754, a radially outer panel 756, and an axially panel 758 as shown in FIG. 11. The radially inner panel 754 is spaced radially inward of the radially outer panel 756 relative to the axis 11. The radially outer panel 756 engages a radially inner surface 731 of the turbine case 720. The axial panel 758 extends between and interconnects the radially inner and outer panels 754, 756 to form the C-shape shape of the torsion box 746 when viewed circumferentially around the axis 11.

In the illustrative embodiment, the axial panel 758 is located at the forward end of the radially inner and outer panels 754, 756. The axial panel 758 extend between and interconnects the forward ends of the radially inner and outer panels 754, 756.

The radially inner panel 754 engages the outer end wall 780 of the turbine vane 742. The radially inner panel 754 engages the end wall 780 to reduce or prevent vane tilting of the turbine vane 742.

In the illustrative embodiment, the case fasteners 750 are threaded fasteners that engage the tapped holes 762 formed in the panel 756 that makes up portion of the C-shape of the torsion box 746. The case fasteners 750 extend through the turbine case 720 and into the panel 756 of the torsion box 646 that engages the turbine case 720.

Another embodiment of a turbine assembly 818 in accordance with the present disclosure is shown in FIG. 12. The turbine assembly 818 is substantially similar to the turbine assembly 18 shown in FIGS. 1-3 and described herein. Accordingly, similar reference numbers in the 800 series indicate features that are common between the turbine assembly 18 and the turbine assembly 818. The description of the turbine assembly 18 is incorporated by reference to apply to the turbine assembly 818, except in instances when it conflicts with the specific description and the drawings of the turbine assembly 818.

The turbine assembly 818 includes a turbine case 820, a vane stage 824, and a vane-stage support 826 as shown in FIG. 12. The vane stage 824 is located between the turbine wheel assemblies 22 and includes a turbine vane 842 configured to redirect air received from an upstream turbine wheel assembly 22 moving through a primary gas path 23 of the gas turbine engine 10 toward a downstream turbine wheel assembly 22. The vane-stage support 826 is configured to hold the turbine vane 842 and an inner vane seal land 844 included in the vane stage 824 in place relative to the turbine case 820.

The turbine case 820 includes an annular shell 828, a forward bracket 830, and an aft bracket 832 as shown in FIG. 12. The annular shell 828 is generally arranged around the axis 11. Each of the brackets 830, 832 extend radially inward from a radially inner surface 831 of the annular shell 828. The aft bracket 832 is spaced axially aft of the forward bracket 830.

In the illustrative embodiment, the forward and aft brackets 830, 832 each include a radially-extending portion 834 and an axially-extending portion 836. The radially-extending portion 834 extends radially inward from the annular shell 828. The axially-extending portion 836 extends axially forward and away from the radially-extending portion 834 to form an L-shape when viewed circumferentially around the axis 11.

The vane-stage support 826 includes a torsion box 846, a spar 848, and a plurality of spar fasteners 852 as shown in FIG. 12. The torsion box 846 is arranged radially inward of the turbine case 820 and radially outward of the turbine vane 842. The spar 848 extends radially inwardly from the torsion box 846 through the turbine vane 842 to the inner vane seal land 844. The turbine vane 842 and the inner vane seal land 844 are coupled to the spar 848 so that forces applied to the vane stage 824 are carried by the spar 848 to the torsion box 846 and ultimately the turbine case 820 during use of the turbine assembly 818 in the gas turbine engine 10. The spar fasteners 852 fix the spar 448 to the torsion box 46.

The torsion box 846 includes radially inner and outer panels 854, 856 and axially forward and aft panels 858, 860 as shown in FIG. 12. The radially inner panel 854 is spaced radially inward of the radially outer panel 856 relative to the axis 11. The axially aft panel 860 is spaced axially aft of the axially forward panel 858 relative to the axis 11. The radially inner and outer panels 854, 856 extend between and interconnect the axially forward and aft panels 858, 860 to form the rectangular shape of the torsion box 846. In the illustrative embodiment, the radially outer panel 856 extends axially forward and aft past the axial forward and aft panels 858, 860.

The radially outer panel 856 of the torsion box 846 is shaped to include a forward hanger 894 and an aft hanger 895 as shown in FIG. 12. The forward and aft hangers 894, 895 extend radially outward from the rectangular shape and engage the brackets 834, 836 included in the turbine case 820 to couple the vane-stage support 826 to the turbine case 820. In the illustrative embodiment, the forward and aft hangers 894, 895 extend radially outward from the radially outer panel 856 at the forward and aft end of the panel 856 that extend past the axially forward and aft panels 858, 860.

The forward and aft hangers 894, 895 are each shaped to include a radially-extending portion 896 and an axially-extending portion 897 as shown in FIG. 12. The radially-extending portion 896 extends radially outward and away from the radially outer panel 856 toward the turbine case 820. The axially-extending portion 897 extends axially aft and away from the radially-extending portion 896 toward the respective bracket 894, 895 of the case 820. In the illustrative embodiment, the hangers 896, 897 are each shaped to have an L-shape when viewed in the circumferential direction around the central reference axis 11.

Another embodiment of a turbine assembly 918 in accordance with the present disclosure is shown in FIG. 13. The turbine assembly 918 is substantially similar to the turbine assembly 18 shown in FIGS. 1-3 and described herein. Accordingly, similar reference numbers in the 900 series indicate features that are common between the turbine assembly 18 and the turbine assembly 918. The description of the turbine assembly 18 is incorporated by reference to apply to the turbine assembly 918, except in instances when it conflicts with the specific description and the drawings of the turbine assembly 918.

The turbine assembly 918 includes a turbine case 920, a vane stage 924, and a vane-stage support 926 as shown in FIG. 13. The vane stage 924 is located between the turbine wheel assemblies 22 and includes a turbine vane 942 configured to redirect air received from an upstream turbine wheel assembly 22 moving through a primary gas path 23 of the gas turbine engine 10 toward a downstream turbine wheel assembly 22. The vane-stage support 926 is configured to hold the vane stage 924 in place relative to the turbine case 920.

The turbine case 920 includes a forward casing 928 and an aft casing 930 as shown in FIG. 13. The aft casing 930 is spaced axially aft of the forward casing 928 to form a mount aperture 937 in the turbine case 920.

The vane stage 924 includes the turbine vane 942 and the inner vane seal land 944 as shown in FIG. 11. The turbine vane 942 is shaped to form an airfoil 976 that extends across the primary gas path 23 of the gas turbine engine 10. The inner vane seal land 944 is located radially inward of the turbine vane 942 outside of the primary gas path 23. The inner vane seal land 944 is configured to be engaged by the rotating component 92 to create the seal 93 that separates pressure zones P1, P2 within the gas turbine engine 10 when the turbine assembly 918 is used in the gas turbine engine 10.

The turbine vane 942 includes the airfoil 976, an inner end wall 978, and an outer end wall 980 as shown in FIG. 11. The inner end wall 978 extends from the airfoil 976 to define an inner boundary of the primary gas path 23. The outer end wall 980 is spaced radially outwardly from the inner platform 978 and extends from the airfoil 976 to define an outer boundary of the primary gas path 23. The airfoil 976 extends between and interconnects the outer end wall 980 and the inner end wall 978.

The vane-stage support 926 includes a coupling flange 945, a torsion box 946, a spar 948, and a plurality of case fasteners 950 as shown in FIG. 13. The coupling flange 945 extends along a radially-outwardly facing surface 933 of the case 920. The torsion box 946 is arranged radially inward of the turbine case 920 and is coupled to the coupling flange 945. The spar 948 extends radially inwardly from the torsion box 946 through the turbine vane 942 to the inner vane seal land 944. The turbine vane 942 and the inner vane seal land 944 are coupled to the spar 948 so that forces applied to the vane stage 924 are carried by the spar 948 to the torsion box 946 and ultimately the turbine case 920 during use of the turbine assembly 718 in the gas turbine engine 10. The case fasteners 950 extend through holes formed in the turbine case 920 and engage the coupling flange 945 and the torsion box 946 of the vane-stage support 926 to fix the vane-stage support 926 to the turbine case 920.

In the illustrative embodiment, the coupling flange 945 extends forward and aft of the mount aperture 937 along the radially-outwardly facing surface 933 of the case 920. A portion 996 of the coupling flange 945 extends radially inward through the mount aperture 937 to couple with the torsion box 946. The coupling flange 945, torsion box 946, and spar 948 are integrally formed such that the coupling flange 945, the torsion box 946, and the spar 58 are included in a one-piece support component.

The coupling flange 945 includes a center panel 996, a forward portion 997, and an aft portion 998 as shown in FIG. 13. The center panel 996 extends radially-inwardly from the forward and aft portions 997, 998 through the mount aperture 937 formed in the case 920. The torsion box 946 and the spar 948 are coupled to the center panel 996 inside the case 920. The forward portion 997 extends axially forward of the mount aperture 937 from the center panel 997. The aft portion 998 extends axially aft of the mount aperture 937 from the center panel 996.

The torsion box 946 includes radially inner and outer panels 954, 956 and axially forward and aft panels 958, 960 as shown in FIG. 13. The radially inner panel 954 is spaced radially inward of the radially outer panel 956 relative to the axis 11 and engages a radially inner surface 931 of the turbine case 920. The axially aft panel 960 is spaced axially aft of the axially forward panel 958 relative to the axis 11. The radially inner and outer panels 954, 956 extend axially forward and aft from the center panel 996 and interconnect the axially forward and aft panels 958, 960 to form the rectangular shape of the torsion box 946.

The torsion box 946 is shaped to have a rectangular shape when viewed in a circumferential direction around the central reference axis 11 with the center panel 996 of the coupling flange 945 extending through the rectangular shape. In the illustrative embodiment, the center panel 996 of the coupling flange 945 extends through the middle of the torsion box 946 such that the torsion box 946 is arranged on either side of the center panel 996 to form the rectangular shape. In other embodiments, the torsion box 946 may be have a square shape when view in the circumferential direction around the axis 11.

The outer panel 956 is formed to include fastener holes 962 as shown in FIG. 13. The holes 962 extend radially inward through the coupling flange 945, the case 920, and the radially outer panel 956. The In the illustrative embodiment, the vane-stage support 926 further includes an outer compliant seal 970 as shown in FIG. 13. The outer compliant seal 970 is arranged between the radially inner panel 954 and the turbine vane 942. The seal 970 is configured to seal between the torsion box 946 and the vane 942. The seal 970 is also configured to allow radial movement of the turbine vane 942 relative to the vane-stage support 926 in response to thermal growth mismatch between the vane 942 and the vane-stage support 926 caused by different coefficients of thermal expansion of the vane 942 and the support 926 during use of the turbine assembly 918.

In the illustrative embodiment, the seal 970 is located at the axially forward and aft ends of the outer end wall 980 between the vane 942 and the torsion box 946. In other embodiments, the seal 970 is a compliant layer that extends along the The present disclosure teaches transferring loading of the ceramic matrix composite vane 42, 242, 342, 442, 542, 642, 742, 842, 942 to intermediate metallic torsion box 46, 246, 346, 446, 542, 646, 742, 846, 946 prior to turbine casing 20, 220, 320, 420, 520, 620, 720, 820, 920. Transferring the loading from the vane 42, 242, 342, 442, 542, 642, 742, 842, 942 to the torsion box 46, 246, 346, 446, 542, 646, 742, 846, 946 before transferring the loading out through the casing 20, 220, 320, 420, 520, 620, 720, 820, 920 reduces the complexity of the casing integration and alleviates the outer platform seal arrangement. The vane-stage support 26, 226, 326, 426, 526, 626, 726, 826, 926 arrangement offers a high second moment of area solution which reduces stress induced in the ceramic matrix composite material of the vane stage 24, 224, 324, 424, 524, 624, 724, 824, 924.

In metallic vanes embodiments, the metallic vanes are supported with a series of hooks and rails. In some metallic embodiments, the nozzle guide vane structure is supported on hooks and/or rails attached to the outer platform. However, the hook/rail design does not work for structures manufactured from the lower strength SiC/SiC ceramic matrix composite materials. Therefore, in some ceramic matrix composite vanes embodiments, a metallic spar is often incorporated in addition to conventional hook/rail joints.

The present disclosure teaches transferring the load from the nozzle guide vanes 42, 242, 342, 442, 542, 642, 742, 842, 942 outboard to the turbine casing 20, 220, 320, 420, 520, 620, 720, 820, 920. In the illustrative embodiments, the aerodynamic loading is transferred at both the inner and outer extents of the vane 42, 242, 342, 442, 542, 642, 742, 842, 942. The load may be transmitted through a metallic structure or spar 26, 226, 326, 426, 526, 626, 726, 826, 926 out into the casing 20, 220, 320, 420, 520, 620, 720, 820, 920.

In the illustrative embodiments, the load from ceramic matrix composite vanes 42, 242, 342, 442, 542, 642, 742, 842, 942 is transmitted outboard to the turbine casing 20, 220, 320, 420, 520, 620, 720, 820, 920. In metallic embodiments, the vane structure may be supported on hooks and/or rails attached to the outer platform. The hook/rail arrangement does not work for structures manufactured from the lower strength SiC/SiC CMC materials.

Instead, as shown in FIG. 3, the assembly 18 may include a vane-stage support 26 to transfer the aerodynamic loading at both the inner and outer extents of the vane 42. The load would typically transmit through a metallic structure 26 or spar 48 out into the casing. The spar could be integrated directly to the turbine casing 20, but directly coupling the spar 48 to the case 20 would result in a low second moment of area attachment to the casing 20 and consequently high stresses in the spar material.

In some embodiments, the spar 48 may be locally thickened in the vicinity of the casing 20 to increase the second moment of area. However, thickening the spar 48 results in a large weight increase trade off with second moment of area.

The present disclosure teaches a vane-stage support 26 arrangement that minimizes the deflection of the metallic structure 26 to avoid opening gaps at the ceramic matrix composite vane to blade interfaces (increasing leakage) that may be caused by the aerodynamic loading on the turbine vane 42 and the stage 24 loading applied to the inter-stage seal 44. To minimize the deflection in this configuration, the axial length of the spar 48 and the radial engagement between the spar 48 and casing 20 should be maximized.

The present disclosure teaches an arrangement that maximizes the axial length of the spar 48 and the radial engagement of the spar 48 and the case 20, while utilizing the space available. In some embodiments, the spar 48 may be hollow with one or more passage to allow coolant to transit from the outer cavity 61 to cool the ceramic matrix composite material, or to transit through to the intra-disc cavity 88, 90.

A further advantage of using a metallic structure 26 to support the vane 42 is that a degree of axial pre-lean of the vane spar 26 and hence vane assembly 18 may be incorporated. The axial pre-lean of the vane-stage support 26 may optimize clearances across the running range and improve the interface with the rotating components 92.

In the illustrative embodiment of FIG. 3, the spar 48 is coupled to a metallic torsion box 46. The "torsion box" 46 is nominally defined as a short length of hollow rectangular beam that is resistant to twisting or torque forces. In other embodiments, other beam geometries may be used.

The connection of the spar 48 to the torsion box 46 may be made in close radial proximity to the outer platform 80 of the ceramic matrix composite vane 42. The torsion box 46 spans from the inner spar interface to the casing 20 and is coupled to the case 20. The attachment 50 may be achieved by means of a bolted connection (or other suitable mechanical fastener). Alternatively, the connecting the torsion box 846 to the case 820 may be done using casing hooks 894, 895 as shown in FIG. 12.

By arranging the torsion box between the majority of the cavity between the vane 42 and casing 20, the axial deflection of the vane 42 and vane assembly 18 can be minimized. An illustrative example of this arrangement is shown in FIG. 3.

This attachment solution may also provided an increased axial moment to react the load to the casing 20 when compared to a direct spar-to-casing approach. The vane-stage support 26 may be optimized to meet requirements, as weight and size may be traded for reduced deflection.

The attachment of the torsion box 246, 346, 946 to the case 220, 320, 920 may have influence on adjacent features and may be adjusted by changing the width of the torsion box 246, 346, 946. An example of this arrangement is shown in FIGS. 6, 7, and 13.

In the illustrative embodiments of FIGS. 6, 7, and 13, the torsion box 246, 346, 946 may be extended to allow metal to metal sealing against adjacent seal segment assemblies, thus reducing the sealing challenge associated with the ceramic matrix composite to metal thermal expansion mismatch. The embodiments of FIGS. 6, 7, and 13 allow further sealing configurations as shown in to meet the ceramic matrix composite material requirements.

Additionally, the vane-stage support 26 may include off centre bolts 51 through the case 20 and into the torsion box 46 as shown in FIG. 4. The locating bolt 51 may prevent incorrect orientation of the torsion box 46 and vane assembly 42 during assembly.

In some embodiment, the vane-stage support 26 may make use of the open cavity 61 to pre-mix cooling air piped from the compressor. Additionally a more homogenous distribution may be achieved by adding a diffuser arrangement to the torsion box 46. The diffuser may allow cooling air to be delivered with a relatively constant temperature distribution to the ceramic matrix composite vane 42.

The relative simplicity of the present disclosure offers different manufacturing options. The torsion box 46 may be made as a forged and machined ring. In other embodiments, the torsion box 46 may be fabricated from sheet metal.

The material of the torsion box 46 may be a high temperature capable metallic alloy such as a nickel alloy, cast MAR-M247, Hayes 282, or, if the environment was cool enough, potentially Waspalloy or Hastelloy. C263 may be an option if the forged manufacturing route was selected. There is no hard requirement for the torsion box 546 to be closed at the top like as shown in FIG. 9. If on open-top embodiment of the solution were selected then the torsion box 646 may be extruded.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine assembly adapted for use in a gas turbine engine with a turbine vane comprising ceramic matrix composite materials configured to redirect air moving through a primary gas path of the gas turbine, the assembly comprising
    a turbine case arranged around a central reference axis,
    a vane stage including (a) a turbine vane comprising ceramic matrix composite materials shaped to form an airfoil that extends across the primary gas path of the gas turbine engine and (b) an inner vane seal land located radially inward of the turbine vane outside of the primary gas path, the inner vane seal land configured to be engaged by a rotating component to create a seal that separates pressure zones within the gas turbine engine when the turbine assembly is used in the gas turbine engine, and
    a vane-stage support comprising metallic materials that is configured to hold the turbine vane and the inner vane seal land in place relative to the turbine case, the vane-stage support including (i) a torsion box arranged radially inward of the turbine case and radially outward of the turbine vane, the torsion box being shaped to have a rectangular shape when viewed in a circumferential direction around the central reference axis, and (ii) a spar that extends radially inwardly from the torsion box through the airfoil of the turbine vane to the inner vane seal land,
    wherein the turbine vane and the inner vane seal land are coupled to the spar so that forces applied to the vane stage are carried by the spar to the torsion box and ultimately the turbine case during use of the turbine assembly in the gas turbine engine.

2. The assembly of claim 1, wherein the vane-stage support further includes case fasteners that extend through holes formed in the turbine case and that engage the torsion box of the vane-stage support to fix the torsion box to the turbine case.

3. The assembly of claim 2, wherein the case fasteners include threaded fasteners that engage tapped holes formed in panels that make up the rectangular shape of the torsion box.

4. The assembly of claim 2, wherein the vane-stage support includes spar fasteners that fix the spar to the torsion box.

5. The assembly of claim 4, wherein the spar fasteners are threaded fasteners that extend at least partway into a panel of the torsion box that defines at least a part of the rectangular shape.

6. The assembly of claim 1, wherein the turbine vane of the vane stage includes an inner platform that extends from the airfoil to define an inner boundary of the primary gas path and an outer platform spaced radially outwardly from the inner platform that extends from the airfoil to define an outer boundary of the primary gas path.

7. The assembly of claim 6, wherein the rectangular shape provided by the torsion box of the vane-stage support extends axially forward or aft of the outer platform.

8. The assembly of claim 1, wherein the torsion box includes an axial locating shoulder that extends from the rectangular shape and engages the turbine vane to block axial movement of the turbine vane in at least one direction.

9. The assembly of claim 8, wherein the torsion box includes a forward axial locating shoulder located radially inward of the rectangular shape that engages a forward facing side of the turbine vane to block forward movement of the turbine vane relative to the torsion box and an aft axial locating shoulder located radially inward of the rectangular shape that engages an aft facing side of the turbine vane to block aftward movement of the turbine vane relative to the torsion box.

10. The assembly of claim 1, wherein the turbine case includes a forward shell and an aft shell, the torsion box includes at least one case-coupling flange arranged between the forward shell and the aft shell of the turbine case to couple the torsion box to the turbine case.

11. The assembly of claim 10, wherein the forward casing includes an annular shell and a forward flange that extends radially outwardly from the annular shell, the aft casing includes an annular shell and an aft flange that extends radially outwardly, and the vane-stage support includes case fasteners that extend axially into the forward flange, through the case-coupling flange, and into the aft flange.

12. The assembly of claim 10, wherein the coupling flange extends along a radially-outwardly facing surface of the case and includes a spar fixture that extends radially-inwardly from the coupling flange through a mount aperture formed in the case and coupled to the spar inside the case, a forward portion that extends axially forward of the mount aperture, and an aft portion that extends axially aft of the mount aperture.

13. The assembly of claim 1, wherein the torsion box includes hangers that extend radially outward from the rectangular shape and that engage brackets included in the turbine case to couple the vane-stage support to the turbine case.

14. The assembly of claim 13, wherein the hangers are each shaped to have an L-shape when viewed in the circumferential direction around the central reference axis.

15. The assembly of claim 14, wherein the hangers include a forward hanger that extends axially forward from the torsion box and engages a forward bracket included in the turbine case and an aft hanger that extends axially aft from the torsion box and engages an aft bracket included in the turbine case.

16. A turbine assembly, the assembly comprising
a turbine case arranged around a central axis, the turbine case including a forward casing with a forward flange that extends radially and an aft casing with an aft flange that extends radially outwardly,
a turbine vane comprising ceramic matrix composite materials shaped to form an airfoil,
an inner vane seal land located radially inward of the turbine vane, and
a vane-stage support configured to hold the turbine vane and the inner vane seal land in place relative to the turbine case, the vane-stage support including a torsion box arranged radially inward of the turbine case and radially outward of the turbine vane and a spar that extends inwardly from the torsion box through the airfoil of the turbine vane to the inner vane seal land,
wherein the spar supports the turbine vane and the inner vane seal land so that forces applied to the turbine vane and the inner vane seal land are carried by the spar to the torsion box and turbine case during use of the turbine assembly in the gas turbine engine.

17. The assembly of claim 16, wherein the torsion box is shaped to have a C-shape cross-section when viewed in a circumferential direction around the central reference axis.

18. The assembly of claim 17, wherein the vane-stage support further includes case fasteners that extend through holes formed in the turbine case and that engage the torsion box of the vane-stage support to fix the torsion box to the turbine case.

19. The assembly of claim 18, wherein the case fasteners include threaded fasteners that engage tapped holes formed in a panel of the torsion box that defines at least a part of the C-shape.

20. The assembly of claim 19, wherein the vane-stage support further includes spar fasteners that fix the spar to the torsion box.

* * * * *